United States Patent
Bonerb et al.

[11] Patent Number: 6,131,756
[45] Date of Patent: Oct. 17, 2000

[54] COLLAPSIBLE TANK FOR CONVERTIBLE FREIGHT CONTAINER

[75] Inventors: James J. Bonerb, Orchard Park; Thomas J. Bonerb, West Falls; David Bounerba, Orchard Park, all of N.Y.

[73] Assignee: Converta-Vans, Incorporated, Buffalo, N.Y.

[21] Appl. No.: 08/933,605

[22] Filed: Sep. 18, 1997

Related U.S. Application Data

[63] Continuation-in-part of application No. 08/654,855, May 29, 1996.

[51] Int. Cl.[7] .................................................. B65D 33/00
[52] U.S. Cl. ............................ 220/1.5; 220/9.2; 220/666
[58] Field of Search ............................ 220/1.5, 666, 9.2

[56] References Cited

U.S. PATENT DOCUMENTS

| | | | |
|---|---|---|---|
| Re. 32,232 | 8/1986 | Bonerb et al. | 222/95 |
| 733,542 | 7/1903 | Converse | 383/17 X |
| 1,240,817 | 9/1917 | Brumbaugh | 220/9.2 X |
| 1,931,970 | 10/1933 | Thurston | 220/9.2 |
| 2,042,288 | 5/1936 | Bach et al. | 220/9.2 X |
| 2,553,728 | 5/1951 | Skreberg | 220/9.2 |
| 2,712,797 | 7/1955 | Woehrle et al. | 105/367 |
| 3,173,573 | 3/1965 | Donegan | 220/666 X |
| 3,386,605 | 6/1968 | LaFont | 220/1.5 |
| 3,514,151 | 5/1970 | Hacker | 296/39 |
| 3,756,469 | 9/1973 | Clark et al. | 222/105 |
| 3,941,258 | 3/1976 | Ide | 214/17 D |
| 3,964,636 | 6/1976 | Rehrig | 220/403 |
| 4,092,051 | 5/1978 | D'Orazio | 298/24 |
| 4,241,947 | 12/1980 | Schroder | 296/10 |
| 4,421,250 | 12/1983 | Bonerb et al. | 222/95 |
| 4,449,646 | 5/1984 | Bonerb et al. | 222/95 |
| 4,453,645 | 6/1984 | Usui et al. | 220/22 |
| 4,476,998 | 10/1984 | Bonerb et al. | 222/61 |
| 4,487,335 | 12/1984 | Bonerb | 222/57 |
| 4,497,259 | 2/1985 | Titterton | 105/359 |
| 4,534,596 | 8/1985 | Bonerb | 298/27 |
| 4,541,765 | 9/1985 | Moore | 414/267 |
| 4,557,400 | 12/1985 | Clarke | 222/105 |
| 4,563,307 | 1/1986 | Bonerb | 222/386.5 |
| 4,574,984 | 3/1986 | Bonerb | 222/61 |
| 4,574,986 | 3/1986 | Baris et al. | 222/94 |
| 4,583,663 | 4/1986 | Bonerb | 222/61 |
| 4,603,795 | 8/1986 | Bonerb et al. | 222/262 |
| 4,627,629 | 12/1986 | O'Neill | 280/5 D |
| 4,643,475 | 2/1987 | Neumann | 296/10 |
| 4,673,112 | 6/1987 | Bonerb | 222/386.5 |
| 4,678,389 | 7/1987 | Bonerb | 414/267 |
| 4,722,655 | 2/1988 | Bonerb | 414/288 |
| 4,728,004 | 3/1988 | Bonerb | 222/61 |
| 4,735,457 | 4/1988 | Bonerb et al. | 298/27 |
| 5,201,432 | 4/1993 | Elvin-Jensen | 220/1.5 |
| 5,263,601 | 11/1993 | Borow | 220/1.5 X |
| 5,429,437 | 7/1995 | Shaw et al. | 220/9.2 X |
| 5,437,384 | 8/1995 | Farrell | 220/404 X |
| 5,524,781 | 6/1996 | Podd et al. | 220/1.5 |
| 5,647,514 | 7/1997 | Toth et al. | 220/1.5 |

*Primary Examiner*—Steven Pollard
*Attorney, Agent, or Firm*—Joseph P. Gastel

[57] ABSTRACT

A freight container in the form of a tractor-trailer or intermodal container which is convertible for selectively carrying solid freight or bulk liquid freight including a housing, a plurality of collapsible tanks in the housing, liquid outlets in the tanks and conduits in communication with the liquid outlets located entirely within the housing and an opening in the housing proximate the outlets of the conduits. A liquid washing assembly is permanently mounted on the tanks both in the expanded and collapsed conditions of the tanks. Guide structure is provided in association with the frame of the collapsible tanks for guiding the frame in a perfectly vertical direction both when the tanks are being expanded and being collapsed. The upper and lower edges of the tank sides are bolted and clamped to their associated frames.

16 Claims, 16 Drawing Sheets

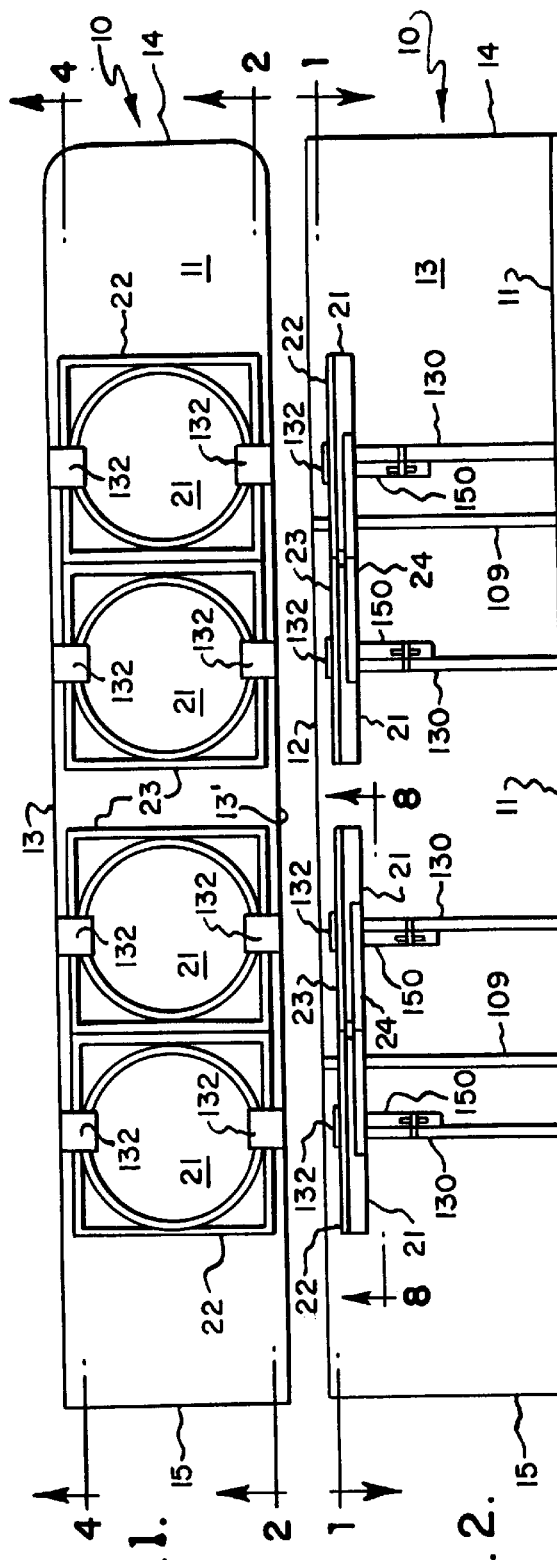
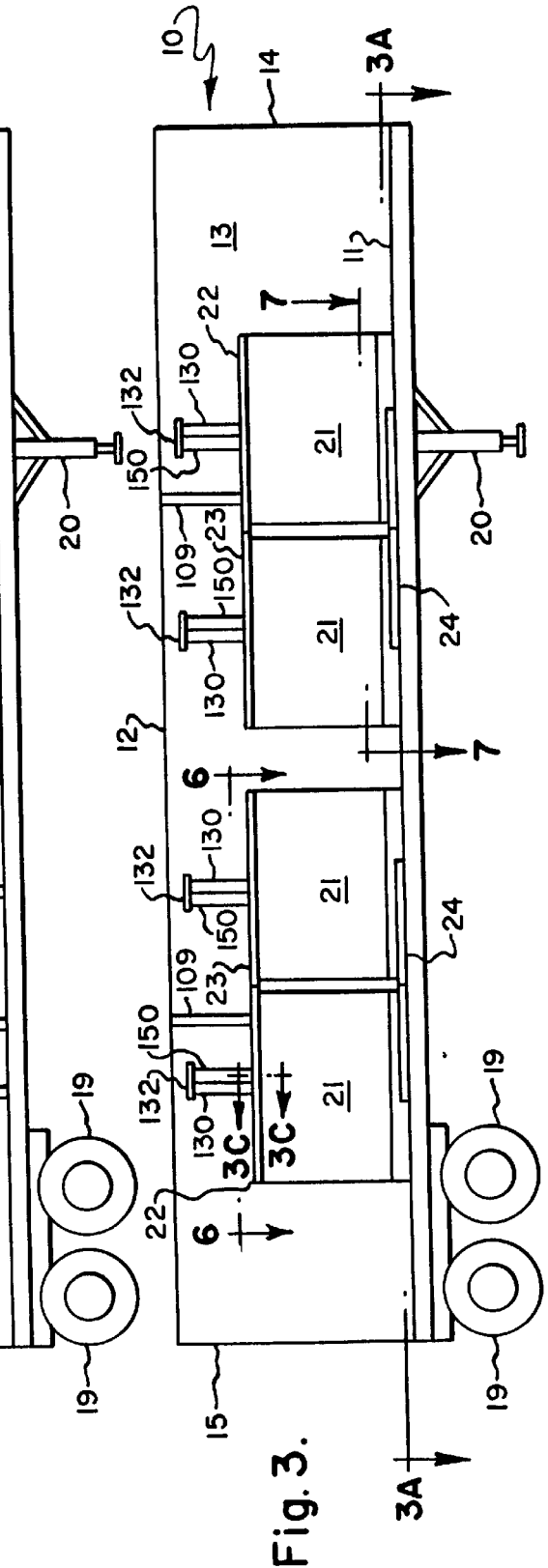

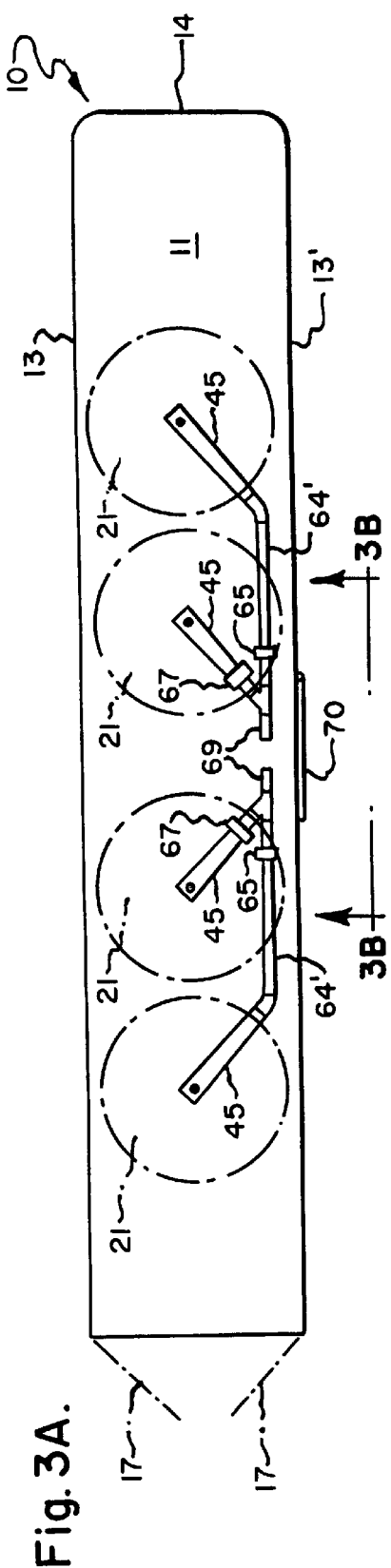
Fig. 3A.
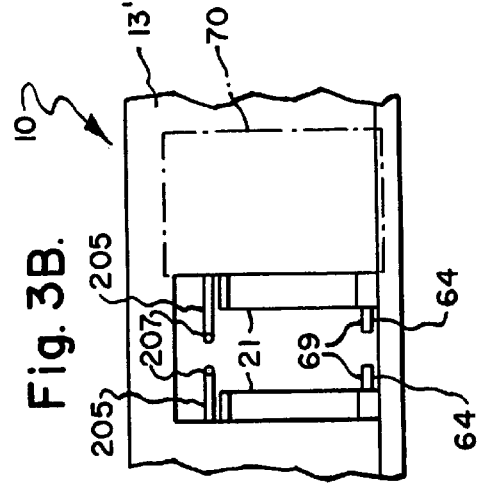
Fig. 3B.
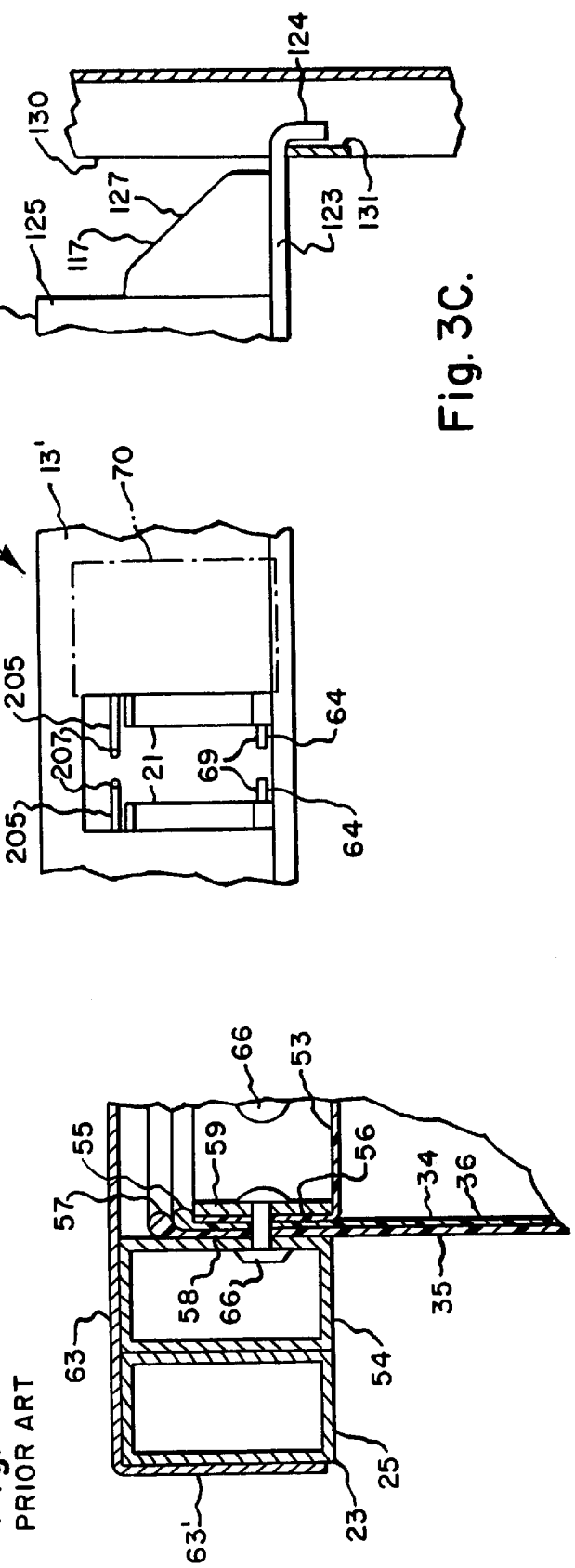
Fig. 3C.
Fig. 9B.
PRIOR ART

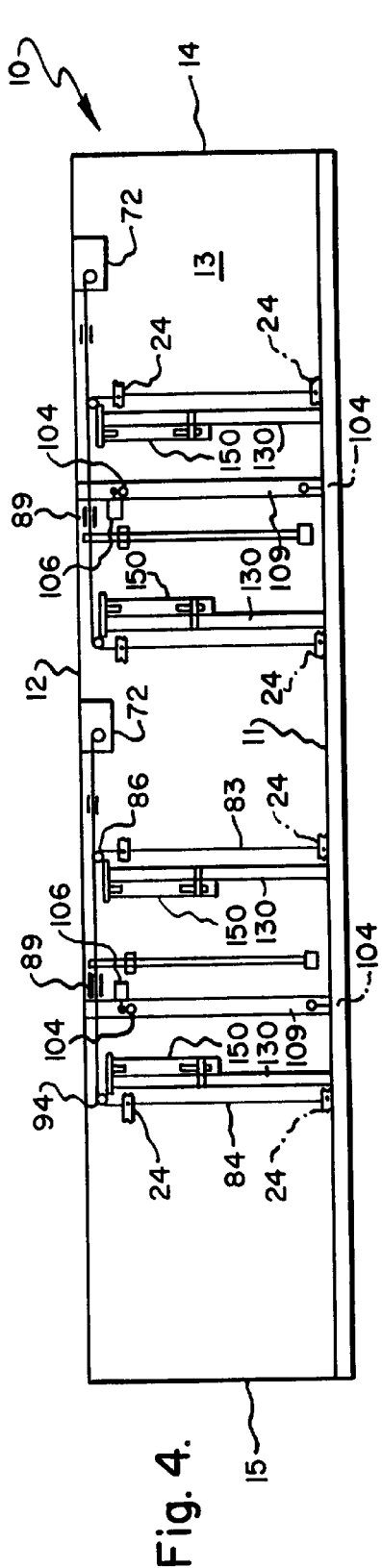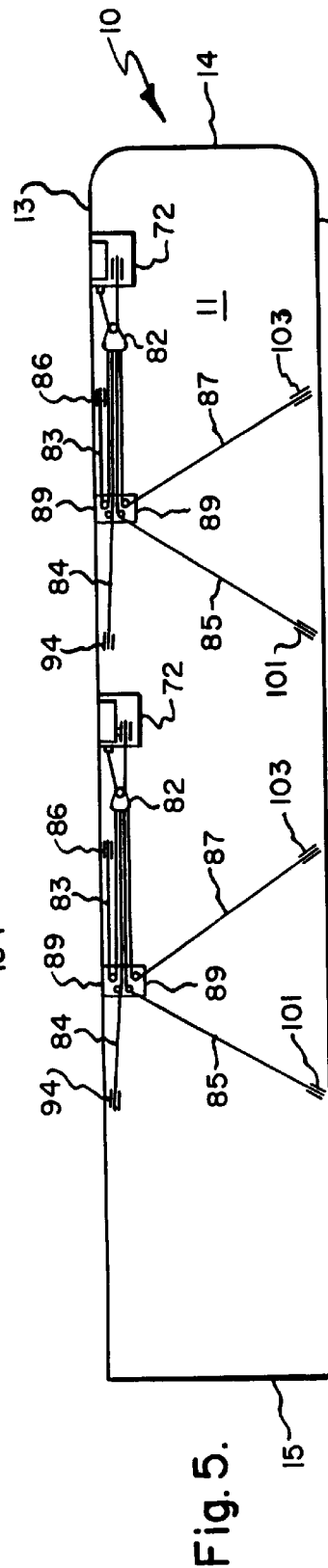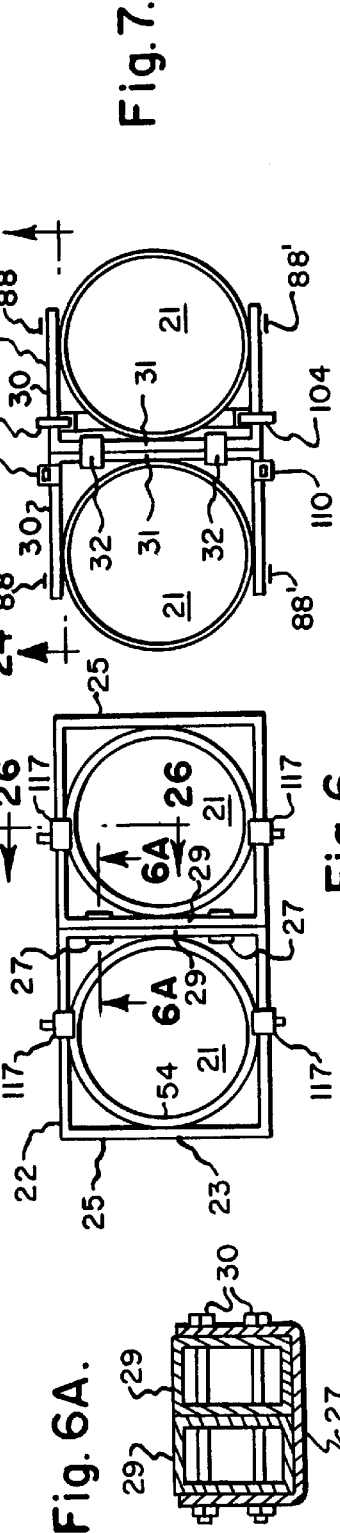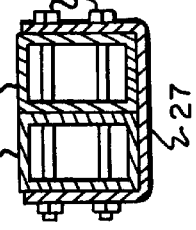

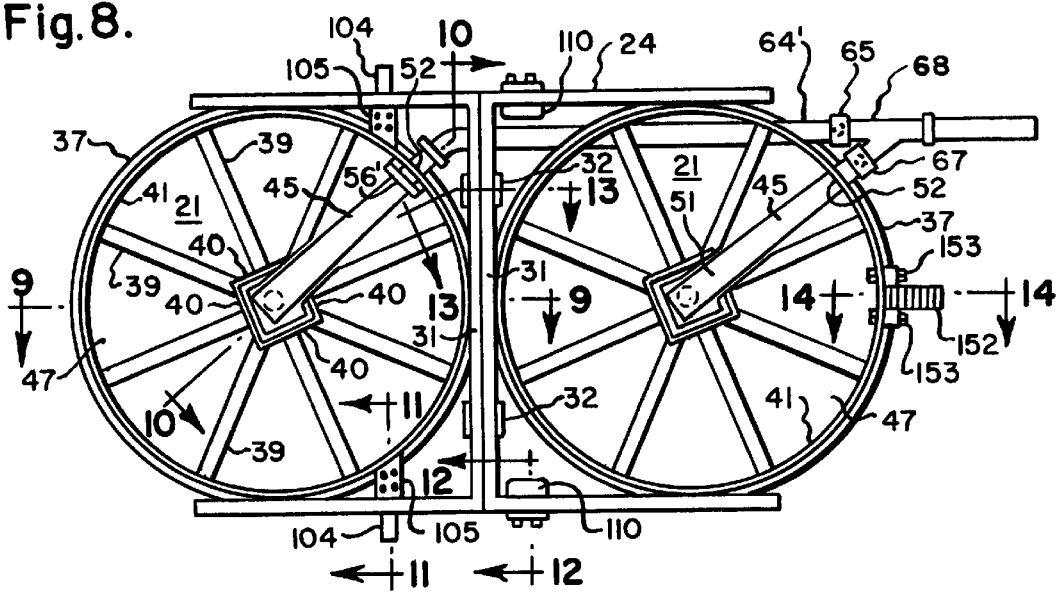
Fig. 8.
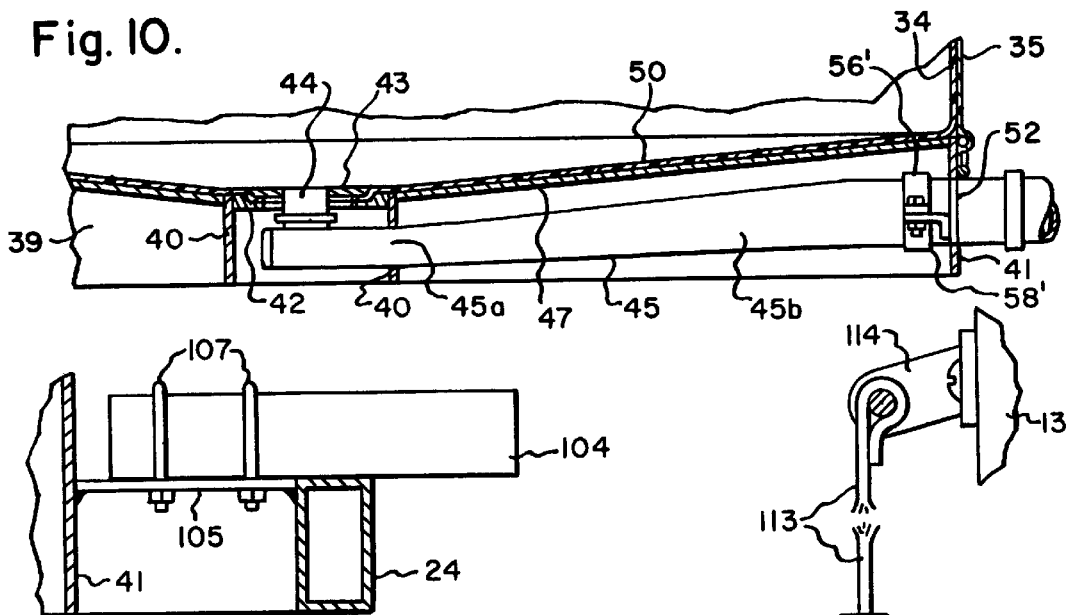
Fig. 10.
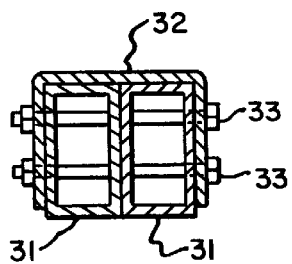
Fig. 11.
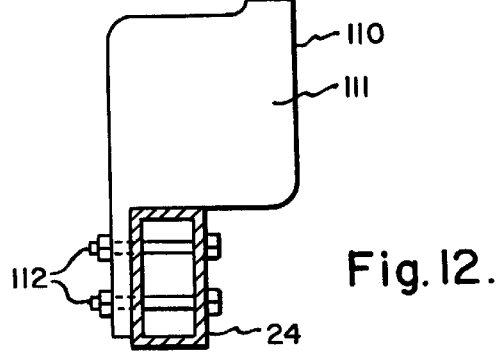
Fig. 13.
Fig. 12.

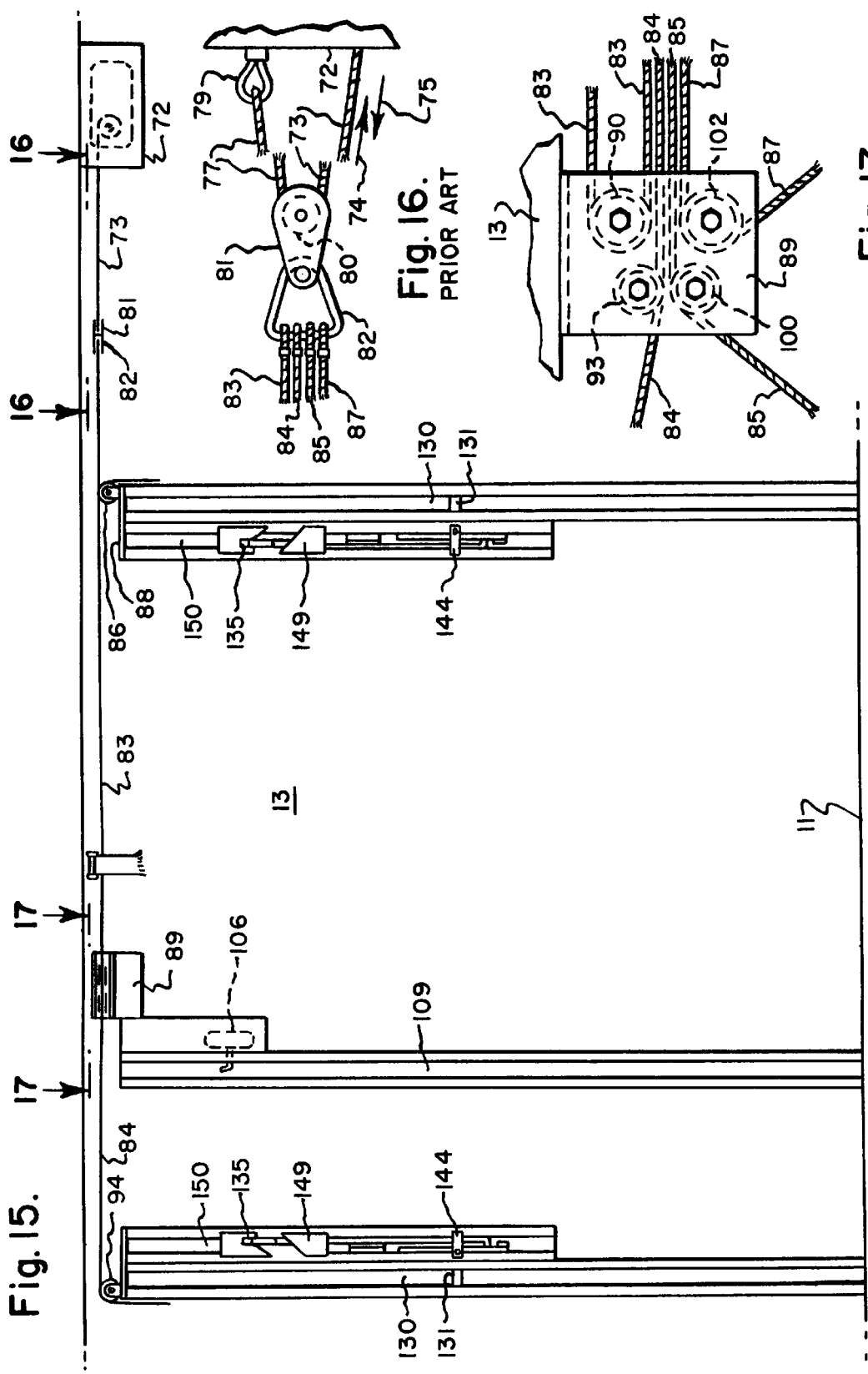
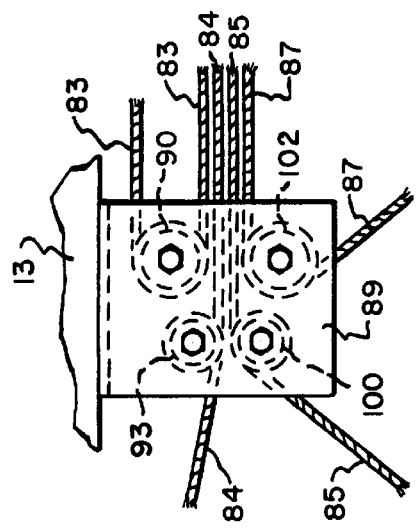
Fig. 15.
Fig. 16. PRIOR ART
Fig. 17. PRIOR ART

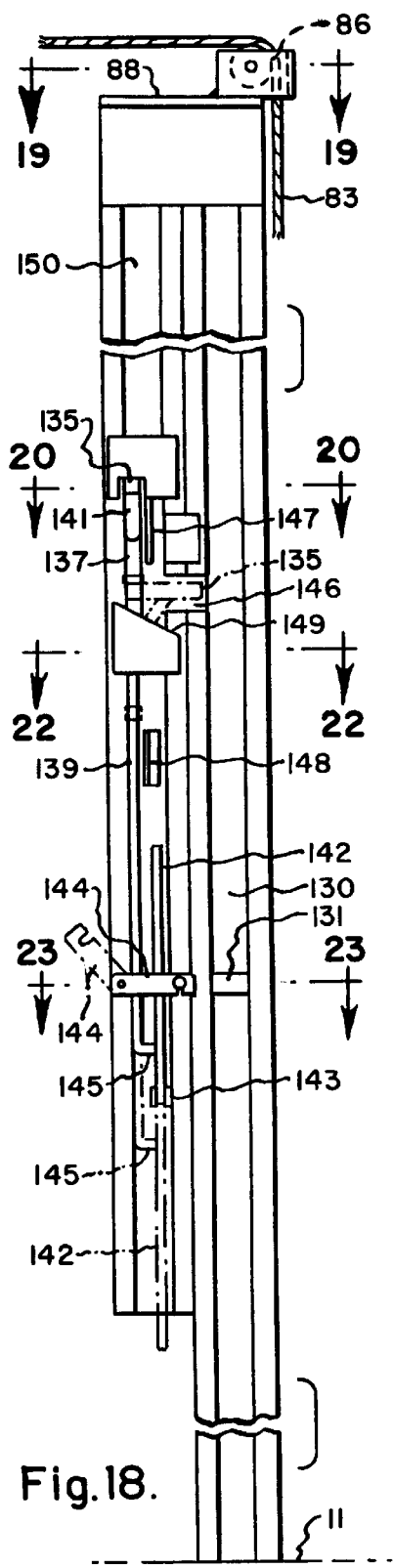
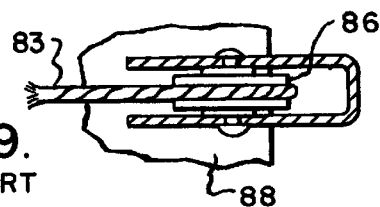
Fig. 19.
PRIOR ART
Fig. 20.
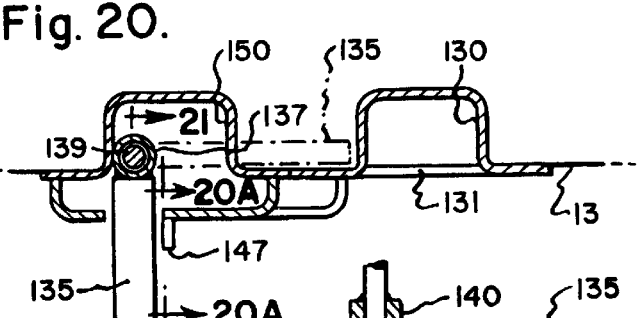
Fig. 20A.
PRIOR ART
Fig. 21.
PRIOR ART
Fig. 22.
PRIOR ART
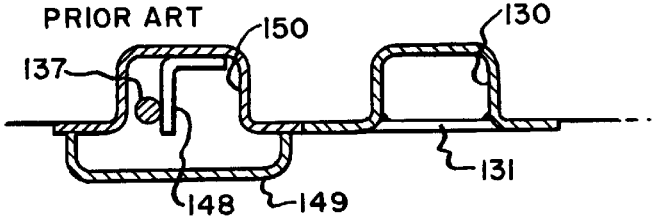
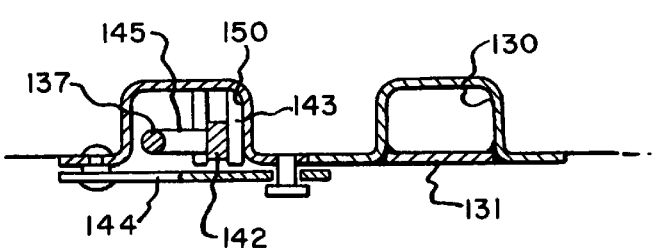
Fig. 23.
Fig. 18.

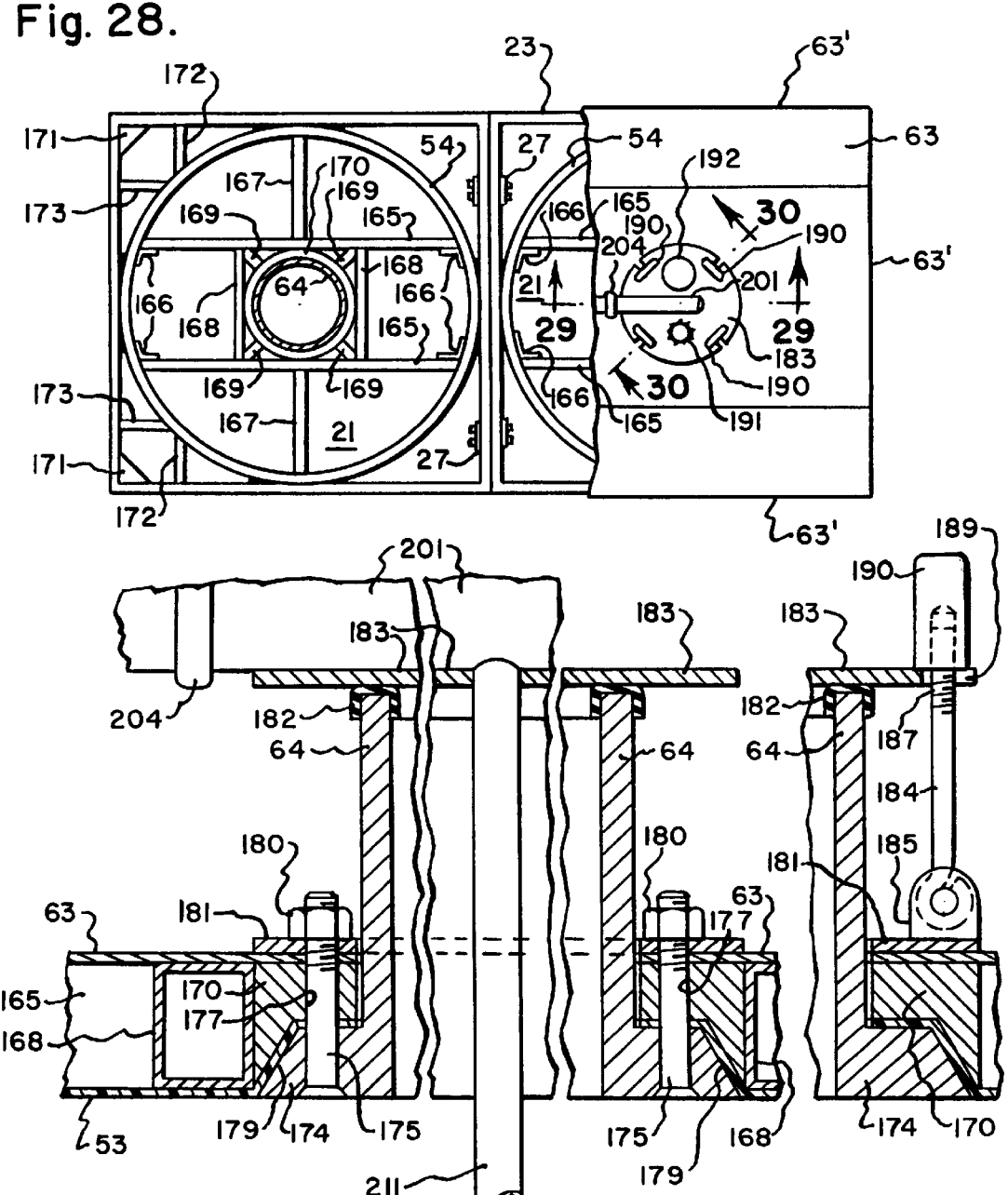

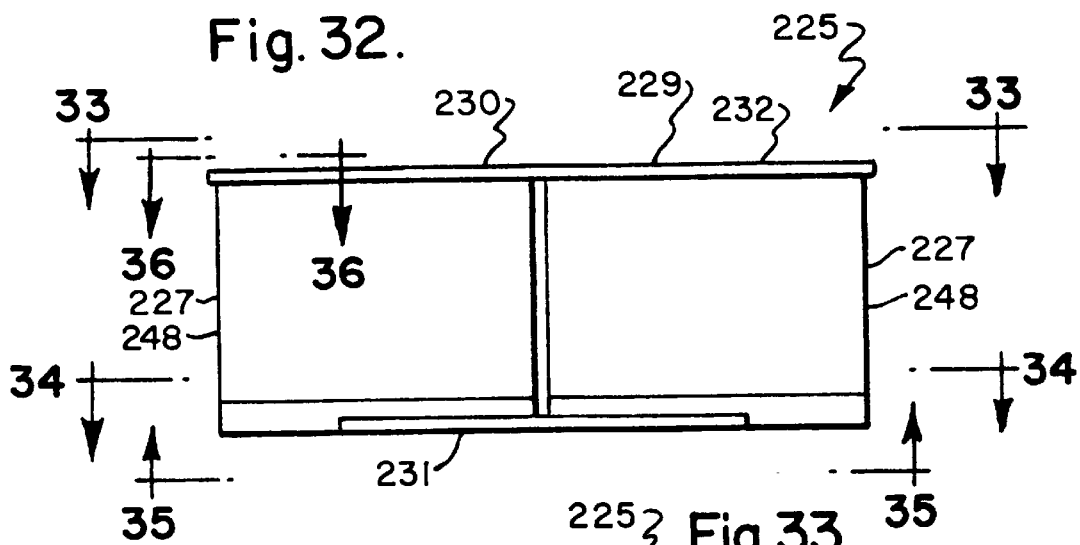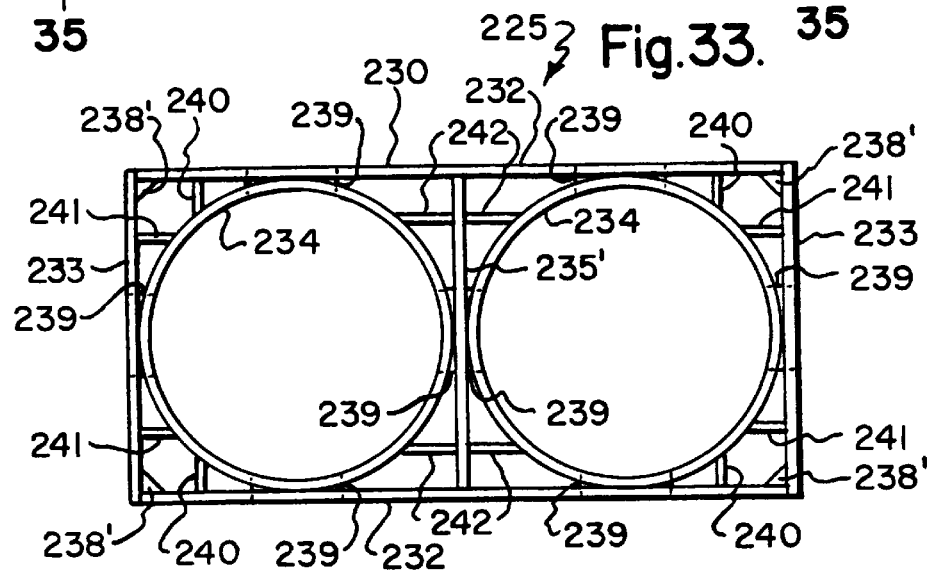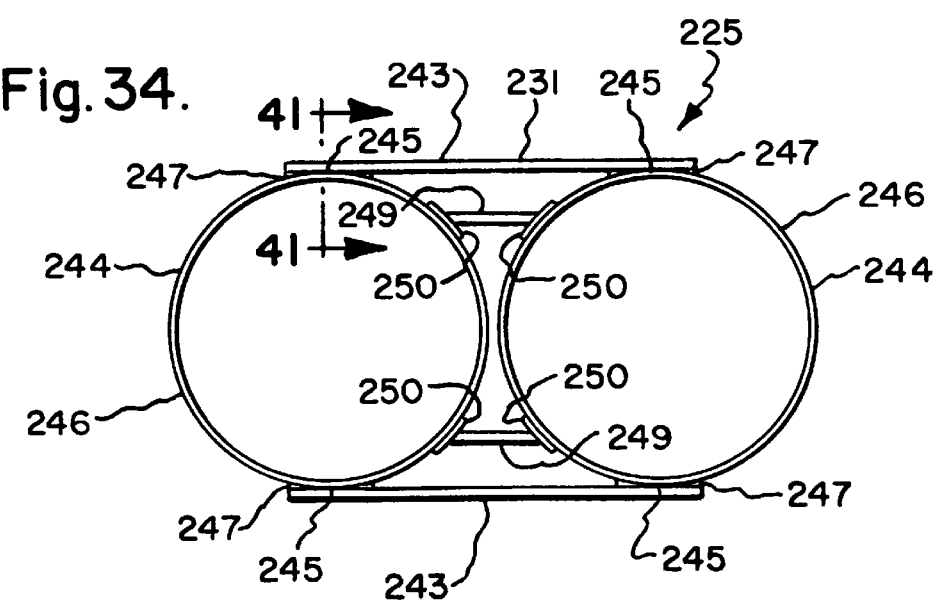

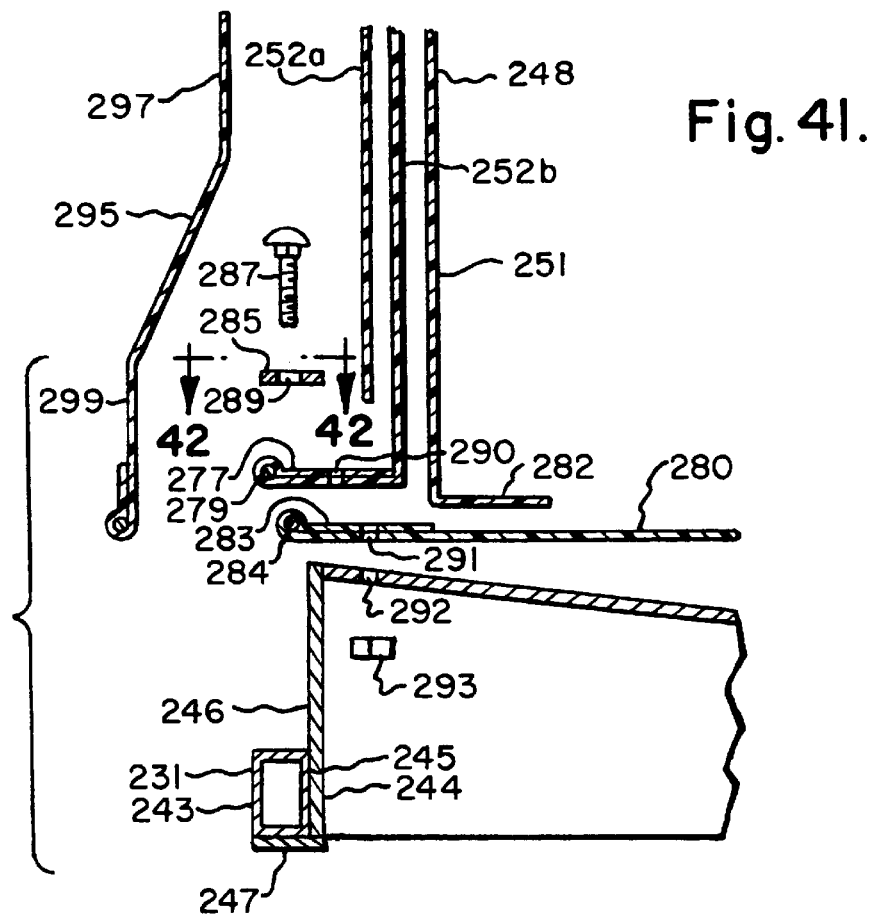
Fig. 41.
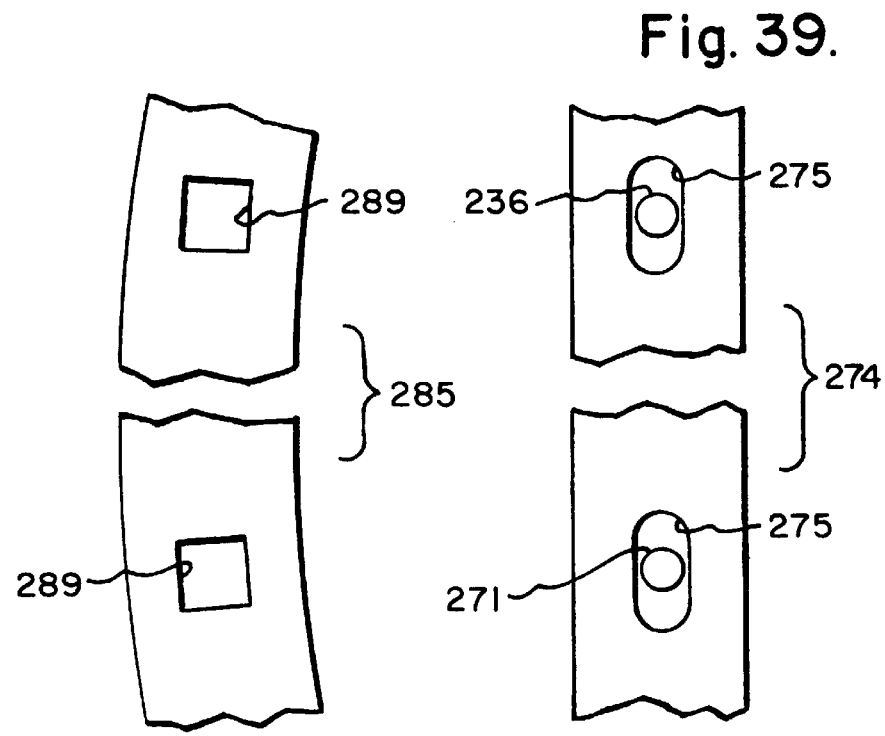
Fig. 39.
Fig. 42.

COLLAPSIBLE TANK FOR CONVERTIBLE FREIGHT CONTAINER

CROSS-REFERENCE TO RELATED APPLICATIONS

The present application is a continuation-in-part of application Ser. No. 08/654,855, filed May 29, 1996.

BACKGROUND OF THE INVENTION

The present invention relates to an improved collapsible tank structure for a freight container which is convertible to selectively carry solid freight or bulk liquid freight.

BRIEF SUMMARY OF THE INVENTION

It is one object of the present invention to provide an improved collapsible tank structure for a convertible freight container in which the flexible wall of the tank is attached to its associated frame structure in an extremely strong and leak-resistant manner.

It is another object of the present invention to provide an improved collapsible tank structure for a freight container in which the flexible wall of the tank is secured to frame members in an unique manner which is conducive to ease of assembly. Other objects and attendant advantages of the present invention will readily be perceived hereafter.

The present invention relates to a collapsible tank comprising an upper rim, a base, a lower rim on said base, a flexible side, an upper edge on said flexible side, a mounting band mounted on said upper rim, a plurality of elongated fasteners extending inwardly from said mounting band, a plurality of first holes in said upper edge of said flexible side through which said elongated fasteners extend, a retaining band extending substantially parallel to said mounting band, and a plurality of second holes in said retaining band through which said elongated fasteners extend.

The present invention also relates to a collapsible tank comprising an upper rim, a base, a lower rim on said base, a flexible side, an upper edge on said flexible side, a plurality of elongated fasteners extending inwardly entirely through said upper rim, a plurality of first holes in said upper edge of said flexible side through which said elongated fasteners extend, a retaining band extending substantially parallel to said mounting band, and a plurality of second holes in said retaining band through which said elongated fasteners extend.

The various aspects of the present invention will readily be perceived hereafter when the following portions of the specification are read in conjunction with the accompanying drawings wherein:

BRIEF DESCRIPTION OF THE SEVERAL VIEWS OF THE DRAWING

FIG. 1 is a schematic plan view taken substantially along line 1—1 of FIG. 2 and showing certain internal structure of a convertible freight container in the form of a trailer which can selectively carry either bulk liquid freight or packaged solid freight;

FIG. 2 is a schematic side elevational view taken substantially along line 2—2 of FIG. 1 and showing the liquid tanks in a collapsed position to provide space for carrying solid freight;

FIG. 3 is a schematic view similar to FIG. 2 but showing the liquid tanks in an expanded position for carrying bulk liquid freight;

FIG. 3A is a schematic view taken substantially along line 3A—3A of FIG. 3 and schematically showing the internal piping arrangement within the freight container for filling and emptying the tanks;

FIG. 3B is a schematic fragmentary view taken substantially in the direction of arrows 3B—3B of FIG. 3A and showing an open door in the side of the freight container for obtaining access to the outlets of the piping associated with the tanks;

FIG. 3C is a fragmentary cross sectional view taken substantially along line 3C—3C of FIG. 3;

FIG. 4 is a schematic view taken substantially in the direction of arrows 4—4 of FIG. 1 and showing the track structure on the side wall of the container for guiding the tanks between vertically collapsed and expanded positions and also showing portions of the locking assembly for stowing the tanks;

FIG. 5 is a schematic view taken substantially along line 1—1 of FIG. 2 and showing the prior art cable and winch arrangement for expanding and collapsing the tanks;

FIG. 6 is a view taken substantially in the direction of arrows 6—6 of FIG. 3 and showing a top portion of the frame of the tank frame structure;

FIG. 6A is a cross sectional view taken substantially along line 6A—6A of FIG. 6;

FIG. 7 is a plan view taken substantially along line 7—7 of FIG. 3 and showing the bottom portion of the frame of the tank frame structure;

FIG. 8 is a view taken substantially in the direction of arrows 8—8 of FIG. 2 and showing the construction of the bottoms of the tanks and the bottom portion of the frame on which they are mounted and the piping associated therewith;

FIG. 9 is an enlarged fragmentary cross sectional view taken substantially along line 9—9 of FIG. 8 and showing the top and bottom frame portions for the collapsible tanks and the manner in which the flexible inner liner and the flexible outer shell are secured thereto and also showing in solid lines the rotatable spray ball washer secured to the tank hatch and also showing in dotted lines its position when the tank is collapsed;

FIG. 9A is an enlarged fragmentary cross sectional view of portions of FIG. 9 showing in greater detail the fastening connections between the flexible portions of the tank and the top and bottom portions of the frame associated therewith;

FIG. 9B is a greatly enlarged fragmentary view of a portion of FIG. 9A showing the connection between the upper portions of the flexible tank sides and the top portion of the frame;

FIG. 9C is a fragmentary cross sectional view taken substantially along line 9C—9C of FIG. 9 and showing a part of the bottom frame portion of each tank frame;

FIG. 9D is a fragmentary cross sectional view taken substantially along line 9D—9D of FIG. 9A and showing the detail of the band which secures the tank shell to the bottom frame portion;

FIG. 10 is an enlarged fragmentary cross sectional view taken substantially along line 10—10 of FIG. 8 and showing the piping structure in relationship to the supporting base portion of each tank;

FIG. 10A is an enlarged portion of FIG. 10 showing the outlet of the tank and the position of the spray ball in dotted lines when the tank is collapsed;

FIG. 10B is a view taken substantially in the direction of arrows 10B—10B of FIG. 10A;

FIG. 11 is an enlarged fragmentary cross sectional view taken substantially along line 11—11 of FIG. 8 showing the guide for guiding vertical movement of the bottom frame portion as it moves between its stowed and expanded positions;

FIG. 12 is a fragmentary cross sectional view taken substantially along line 12—12 of FIG. 8 and showing the safety strap structure associated with the bottom frame portion and the wall of the freight container;

FIG. 15 is an enlarged view of the track structure shown at the left side of FIG. 4;

FIG. 16 is an enlarged fragmentary view taken substantially in the direction of arrows 16—16 of FIG. 15 showing a portion of the winch and cable arrangement for raising and lowering the top and bottom frame portions associated with the tanks;

FIG. 17 is an enlarged fragmentary view taken substantially in the direction of arrows 17—17 of FIG. 15 and showing the pulley arrangement associated with the various cables connected to the bottom frame portions of the tanks;

FIG. 18 is a fragmentary enlarged view of the channel structure at the extreme left of FIG. 15;

FIG. 19 is a fragmentary cross sectional view taken substantially along line 19—19 of FIG. 18;

FIG. 20 is a fragmentary cross sectional view taken substantially along line 20—20 of FIG. 18 and showing the support bar in an extended position for supporting the bottom frame portion in a stored position and also showing the channel which guides the member which terminates the downward movement of the top frame portion and also showing the bar which limits downward movement of the top frame portion;

FIG. 20A is a fragmentary view taken substantially in the direction of arrows 20A—20A of FIG. 20;

FIG. 21 is a fragmentary enlarged cross sectional view taken substantially along line 21—21 of FIG. 20;

FIG. 22 is a fragmentary cross sectional view taken substantially along line 22—22 of FIG. 18 and showing a portion of the lower cam structure for pivoting the frame supporting bar to a stowed position;

FIG. 23 is a fragmentary cross sectional view taken substantially along line 23—23 of FIG. 18 and showing the latch for retaining the frame supporting bar in a frame stowing position;

FIG. 28 is a fragmentary plan view of the top frame portion and portions of the tank structure associated therewith;

FIG. 29 is an enlarged fragmentary cross sectional view taken substantially along line 29—29 of FIG. 28 and showing the connections at the hatch cover of the tank;

FIG. 30 is a fragmentary cross sectional view taken substantially along line 30—30 of FIG. 28 and showing the structure for holding the hatch cover closed.

FIG. 32 is a side elevational view of an improved collapsible tank unit of the present invention;

FIG. 33 is a plan view taken substantially in the direction of arrows 33—33 of FIG. 32 and showing a portion of the top frame portion of the tank;

FIG. 34 is a view with parts omitted taken substantially along arrows 34—34 of FIG. 32 and showing a portion of the bottom frame portion of the tank;

FIG. 39 is an enlarged fragmentary view taken substantially in the direction of arrows 39—39 of FIG. 38 and showing the structure of the shell retaining band;

FIG. 41 is an enlarged fragmentary exploded cross sectional view taken substantially along line 41—41 of FIG. 34 and showing the structure for securing the shell to the bottom frame portion of the tank;

FIG. 42 is an enlarged fragmentary view taken substantially in the direction of arrows 42—42 of FIG. 41 and showing the bottom retaining band for securing the bottom of the shell to the bottom frame portion.

DETAILED DESCRIPTION OF THE INVENTION

Figure 13:
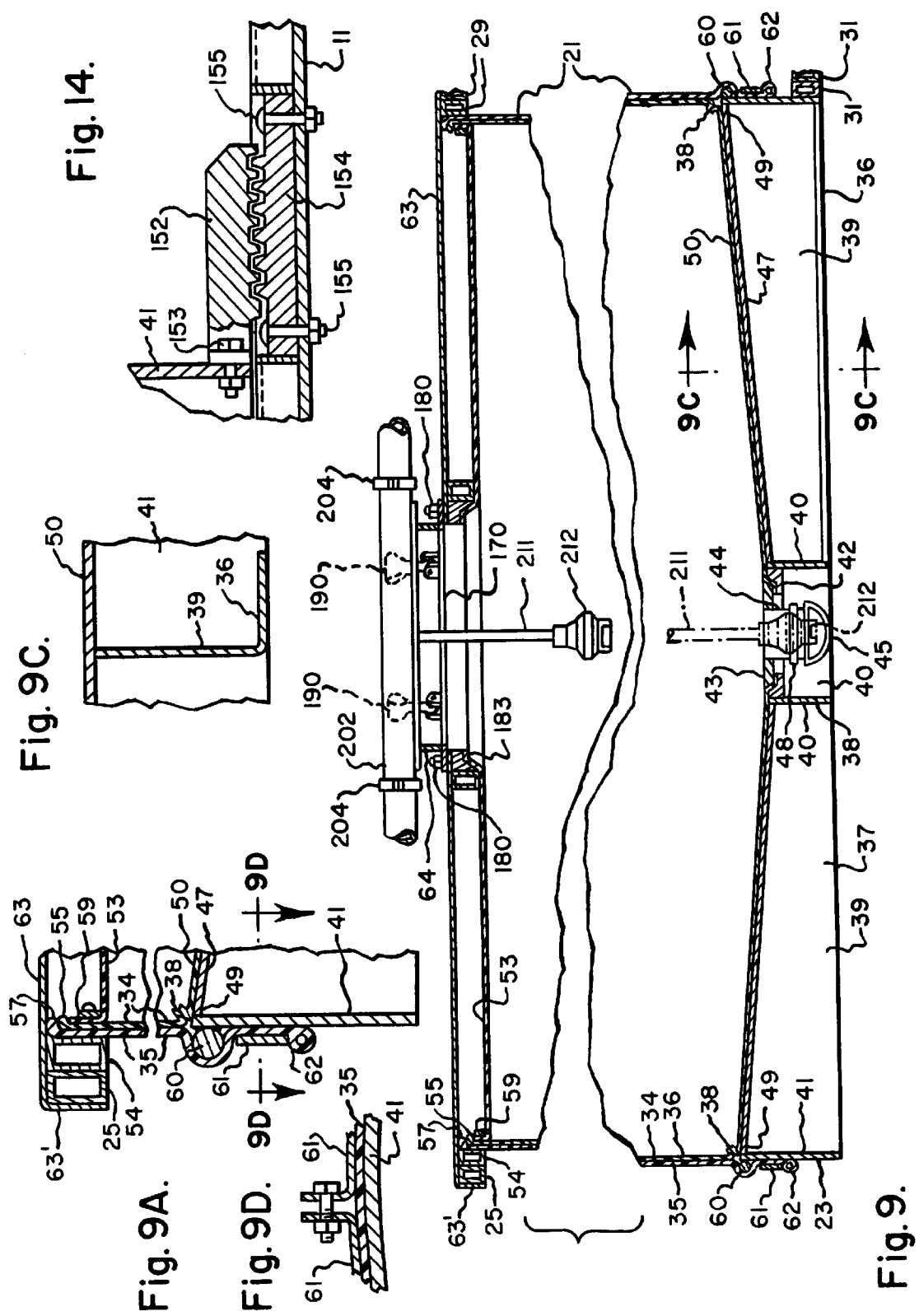
FIG. 13 is a cross sectional view taken substantially along line 13—13 of FIG. 8 and showing the manner in which the two halves of the bottom frame portion are secured to each other.

Summarizing briefly in advance, the present invention relates to a convertible freight container which can selectively carry either bulk liquid freight or packaged solid freight. When it carries packaged solid freight, liquid tanks are maintained in a collapsed condition adjacent the roof of the freight container. When it is desired to carry bulk liquid freight, the tanks are expanded from a collapsed condition and moved so that they are supported on the floor and walls of the freight container. In accordance with one aspect of the present invention, the piping for draining liquid from the tanks is contained entirely within the freight container and access thereto is through an opening in the freight container. In accordance with another aspect of the present invention, the washing assembly associated with the collapsible tanks is permanently mounted on the tanks. In accordance with a third aspect of the present invention, the tank base structure is of a configuration to occupy as little space as possible when the tank is in a collapsed condition to thereby leave more space in the freight container for solid freight.

As is apparent from the drawings, the freight container 10 includes numerous identical parts and numerous mirror image counterparts. However, in the interest of brevity, generally only one part will be described in detail and like numerals will be applied to both other identical parts and mirror image counterparts, which are obvious from the drawings.

The improved freight container 10 is schematically shown in FIGS. 1–5 in the form of a trailer. However, it will be understood that it can be in the form of a freight container of any type including an intermodal shipping container for transportation by ocean vessel, rail and truck. Also the convertible tanks may be installed in a straight truck or in a rail box car. Thus certain structural features described hereafter are equally applicable to a trailer and intermodal freight container and a straight truck and a box car. In fact the various features of the present invention can be installed in any type of freight-carrying body as set forth above, including an aircraft.

The freight container 10 includes a floor 11, a roof 12, and side walls 13 and 13'. It also includes a front wall 14 and a rear end 15 which has conventional doors 17. As noted above, the freight container 10 is in the form of a trailer having rear wheels 19 and a conventional stand 20.

A plurality of collapsible tanks 21 are mounted on frames 22 each consisting of top frame portion 23 and bottom frame portion 24. The tanks 21 are movable from a stowed condition proximate the roof 12 of the freight container (FIG. 2) to an expanded condition wherein they are supported on the floor 11 and sides 13 and 13' of the freight container (FIGS. 3 and 3C). The top frame portion 23 (FIG. 6) consists of two square frame members 25 coupled to each other by U-shaped brackets 27 which bridge frame sides 29 and are secured thereto by bolts 30. The bottom frame portion 24 is fabricated from two U-shaped portions 30 having sides 31 which are coupled to each other by U-shaped brackets 32 (FIG. 13) and bolts 33. The top and bottom frame portions 23 and 24 are fabricated from hollow rectangular tubular aluminum members to minimize weight to thereby permit the container to carry a larger payload.

Each collapsible tank 21 includes an inner flexible liquid impervious liner 34 and a flexible shell 35. Liner 34 is preferably fabricated of suitable sheet plastic, and shell 35 is also preferably fabricated of suitable sheet plastic. The types of plastic, namely, their composition and thickness will depend on the type of liquid which is to be contained therein. In the specific embodiment shown, the tanks are intended to carry corn syrup, and the liner 34 is a urethane composition which has walls which are 40 mils and a bottom 50 which is 100 mils thick, and shell 35 is a urethane composition which is 1/16 inches thick.

Each tank 21 includes a base 37 (FIGS. 8, 9 and 10) consisting of a plurality of aluminum spokes 39 (FIG. 8) of angle-shaped configuration (FIG. 9B) having horizontal legs 36 which rest on floor 11 when the tanks are in an expanded condition. Spokes 39 have their inner ends welded to the sides 40 (FIGS. 8, 9 and 10) of a box-like member 38 and their outer ends welded to aluminum circular frame member 41. A square plate 42 (FIGS. 9, 10, 10A and 10B) is welded to the inner surfaces of sides 40 of box-like member 38. An outlet plate 43 is bolted to plate 42 by a plurality of bolts 43'. Plate 43 has an outlet duct 44 welded thereto. The inner edge 50' (FIG. 10A) of bottom 50 of liner 34 is clamped between plates 42 and 43 by bolts 43' to provide a fluid tight connection between the plates 42 and 43. The outlet duct 44 (FIG. 10A) of plate 43 (FIG. 10A) is secured in fluid tight relationship to neck 46 of conduit 45 by a suitable flange type of clamp 48 with a gasket (not shown) between the flanges 46' and 48' of ducts 44 and 46, respectively. At this point, it will be appreciated that wherever a flange clamp is used, a suitable seal is associated therewith. Conduit 45 extends radially outwardly in base 37 and passes through an opening 51 in box side 40 (FIG. 10) and also passes through an opening 52 in member 41. A clamp 56' (FIG. 10) encircles conduit 45 and is secured to bracket 58' on frame member 41 for holding conduit 45 securely against movement. As can be seen from FIGS. 10 and 10A, conduit 45 has a flattened section 45a which merges into a cylindrical section 45b. This serves the purpose of permitting the base 37 to have relatively little height while still permitting the bottom of the tank to slope toward the outlet and also permitting the conduit 45 to have a standard three inch diameter capacity, which is the original diameter of the conduit 45 before it was flattened at section 45a. It is to be especially noted that the relatively little height of base 37 causes it to occupy relatively little space when the tank is stowed, which, in turn, provides greater volume in the freight container for packaged solid freight.

An aluminum dished plate 47 (FIGS. 9 and 10A) is welded to the tops of spokes 39 with its inner edge 46 welded to box sides 40 and its outer edge welded at 49 (FIGS. 9 and 9A) to outer frame member 41. Thus, dished plate 47 supports the bottom 50 of liner 34. Bottom 50 of liner 34 is a circular piece of plastic which is sealed to the cylindrical side 36 of liner 34 at joint 38. A circular plastic sheet 53 (FIGS. 9, 9A and 9B) has an upstanding cylindrical edge 56 (FIG. 9B) which is plastic welded or heat sealed to top edge portion 58 of liner 34 to provide a liquid and air-tight seal therebetween. The upper edge of liner 34 is formed into a bead 55. The upper edge of outer casing or shell 35 is also formed into a bead 57. Both beads are known as roped edges which are formed by enclosing a rope in the upper edge portion of each of the liner and shell and sealing it therein. A metal band 59 (FIG. 9B) is secured against side 36 of liner 34 and shell 35 below beads 55 and 57, respectively, by a plurality of circumferentially spaced blind fasteners 66 which are suitably spaced to press the liner and shell between it and circular frame member 54 and thus both provide a fluid tight seal between liner 34 and sheet edge 56 and also securely fasten the top of both the liner 34 and shell 35 to the circular frame member 54 which is welded to top frame portion 23. A cylindrical aluminum rod 60 (FIG. 9A) is attached as by welding to base member 41 and the lower portion of shell 35 passes around rod 60 and is clamped to base member 41 by a band 61. The lowermost portion of shell 35 is formed into a roped edge 62 which is located below band 61, and thus by virtue of the foregoing connection, the lower portion of shell 35 is securely held against member 41.

In FIGS. 9, 9A and 28–30, the top hatch 64 and associated structure are shown. A stainless steel cover 63 (FIGS. 9, 9B and 31) is secured across top frame portion 23, and it includes bent down edges 63' which lie against all of the outer sides of top frame portion 23. The top of each tank 21 is supported by a framework on top frame portion 23. More specifically, elongated struts 165 (FIG. 28) are secured to the inner surface of circular frame member 54 by brackets 166. Additional struts 167 are welded between frame member 54 and struts 165, and struts 168 are welded between spaced struts 165. A plurality of short diagonal struts 169 are welded between circular rim 170 and the corners of the square frame defined by struts 168 and the central portions of struts 165. Additionally gussets 171 are welded at the corners of frame 23, and additional struts 172 and 173 are welded into the positions shown in FIG. 28. All of the foregoing struts are hollow aluminum members which are rectangular in cross section.

The above described frame structure supports the hatch 64 and the structure which seals the top 53 of the inner liner 34 with the hatch. More specifically, hatch 64 includes an annular base 174 (FIGS. 29 and 30) with a plurality of circumferentially spaced threaded studs 175 extending upwardly therefrom at twenty degree intervals. The studs 175 extend through holes 177 in circular rim 170. The inner edge 179 of liner top 53 is held in fluid tight relationship between hatch base 174 and circular rim 170 when nuts 180 are tightened onto studs 175 with the inner edge of metal cover sheet 63 located under ring 181. An annular seal 182 is located at the upper edge of hatch 64, and a hatch cover 183 can be tightened onto seal 182 by a plurality of swingable bolts 184 which are swingable from clevis connections 185 on rim 181 with their upper threaded ends 187 being received in slots 189 in hatch cover 183 so that wing nuts 190 will bear on hatch cover 183 when the wing nuts are tightened. The hatch cover 183 has a vent 191 and an inspection port 192. Vent 191 serves the purpose of permitting air to be vented out of the tank 21 as it is being filled and permitting air to be vented into the tank as it is being emptied. Vent 191 is removable for cleaning and also has a baffle function which permits only air to pass therethrough. Inspection port 192 is a hinged cover which can be opened to permit viewing into the tank and permit the taking of samples of the liquid. A conventional spinner or spray ball and associated piping for washing the inside of tank 21 is permanently mounted on cover 183, as discussed in detail hereafter.

In FIG. 3A there is a schematic showing of how the conduits 45 of the tanks 21 are connected to conduits for emptying or filling of the tanks. The two conduits 45 of each pair of tanks 21 are connected to a conduit 64'. A valve arrangement is provided which permits any one tank 21 to be emptied or filled independently of any of the other tanks or they may be emptied or filled simultaneously. In this respect, a valve 65 is provided in each conduit 64'. A valve 67 is provided in each conduit 45 of the two central tanks 21. Therefore, if it is desired to empty or fill either one of the outermost tanks 21 only, the valves 67 are closed and either one of the valves 65 is opened. If it is desired to empty or fill only the two inner tanks 21, valves 65 are closed and either valve 67 is opened. If it is desired to empty or fill all tanks 21 simultaneously, all valves 65 and 67 are opened. The above-described piping may be modified to permit the various tanks 21 to carry different liquids simultaneously. In this respect, the Y 68 is eliminated and valves 65 and 67 are used to control flow relative to its respective tank 21.

At this point it is to be noted that the emptying or filling of the tanks 21 is from the extreme outer ends 69 of conduits 64'. In this respect, in order to empty or fill the tanks it is merely necessary to open door 70 in freight container side 13' so that access may be had to the conduits 64 and valves 65 and 67. Suitable hose connections (not shown) are thereafter merely connected to the outlets 69 of conduits 64 to thereby conduct the liquid to or from tanks 21.

It is to be especially noted that all of the conduits for filling or emptying tanks 21 are completely enclosed within freight container 10, and thus there are no conduits exposed which can be damaged or onto which mud or ice can accumulate.

A structural arrangement is provided for lowering the tanks 21 from their stowed collapsed position of FIG. 2 to their expanded positions of FIG. 3 and for returning the tanks 21 from their expanded positions of FIG. 3 to their stowed collapsed position of FIG. 2. In this respect, a prior art electrically operated winch and cable arrangement is provided. More specifically, a winch 72 (FIGS. 4, 5 and 15) is mounted on wall 13 and it causes cable portion 73 to be pulled into the winch 72 in the direction of arrow 74 (FIG. 16) when the tanks are being raised or it causes the cable portion 73 to be let out in the direction of arrow 75 when the tanks 21 are being lowered. In this respect when the cable is let out in the direction of arrow 75, the frame 22 and tanks 21 mounted thereon will move downwardly by gravity. More specifically, cable portion 73 is connected to cable portion 77, the end of which is secured to winch housing 72 at 79. The central portion of the cable passes around pulley 80 which is mounted on member 81 connected to link 82. A plurality of cables 83, 84, 85 and 87 have their ends secured to link 82. Cables 83, 84, 85 and 87 lead to pulley arrangement 89 (FIG. 17) located on wall 13. At this point it can be seen from FIGS. 4 and 5 that there are two winches 72 and a cable system, such as described above, associated with each.

Figure 24:
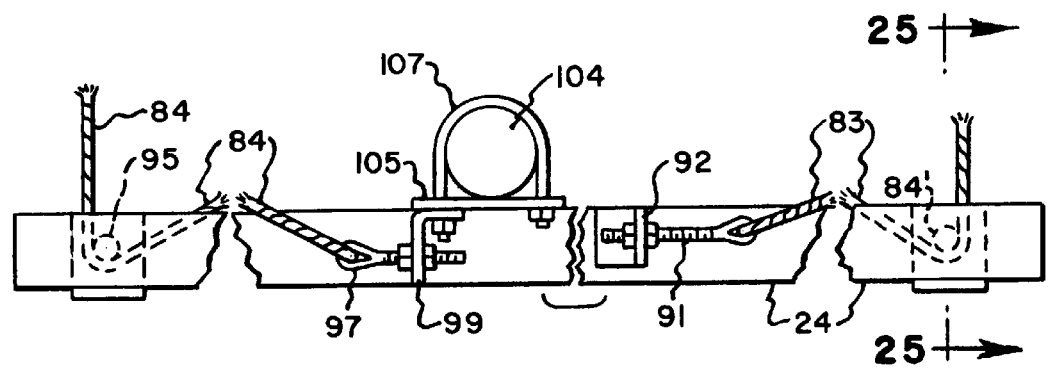
FIG. 24 is an enlarged fragmentary view taken substantially in the direction of arrows 24—24 of FIG. 7 and showing the connections between the lower portions of the cable and the bottom frame portion.
Figure 25:
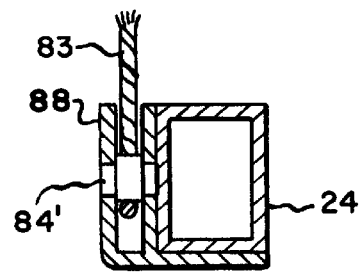
FIG. 25 is a fragmentary cross sectional view taken substantially along line 25—25 of FIG. 24.
Figure 27:
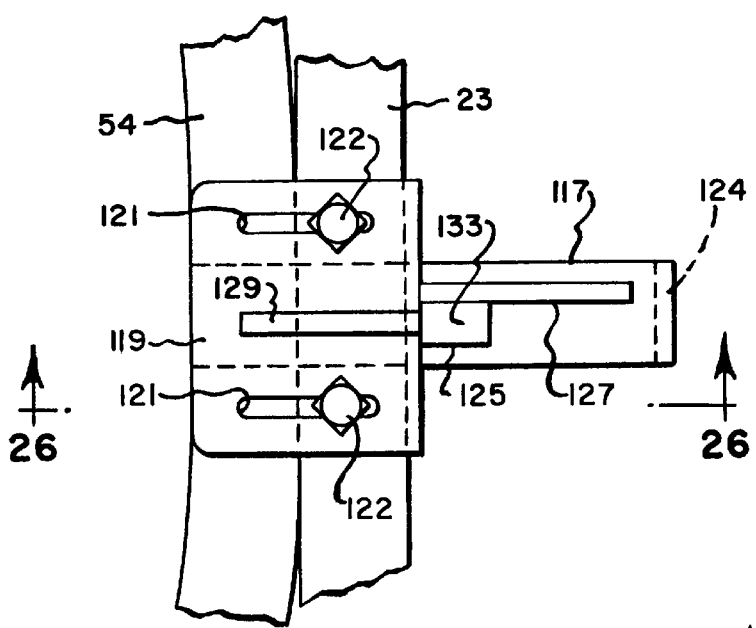
FIG. 27 is a fragmentary view taken substantially in the direction of arrows 27—27 of FIG. 26.
Figure 26:
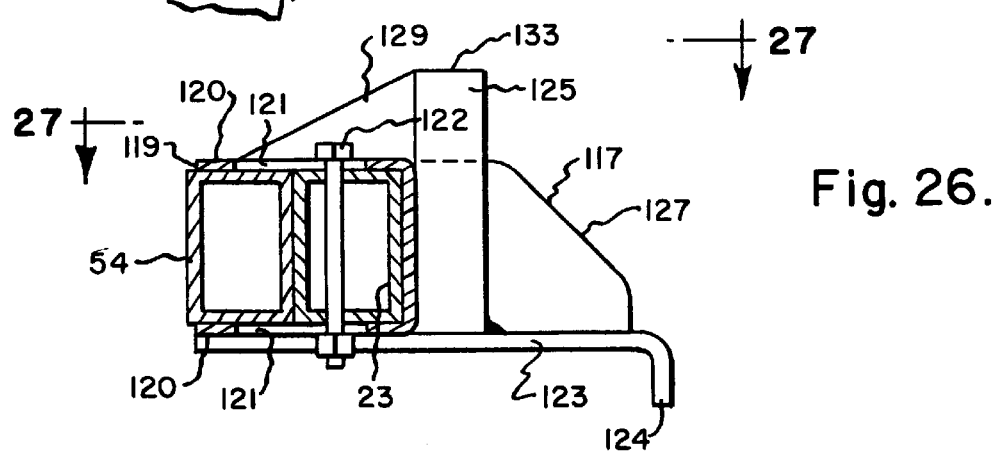
FIG. 26 is a fragmentary cross sectional view taken substantially along line 26—26 of FIG. 27 and showing the structure for stopping both upward and downward movement of the upper frame portion.

Cable 83 (FIG. 17) passes around pulley 90 and then passes around pulley 86 (FIGS. 5, 18 and 19) mounted on plate 88 on wall 13. Cable 83 thereafter passes around pin 84' (FIGS. 24 and 25) on lower frame portion 24 and then passes around a side of frame 24 and attaches to adjustable eye bolt 91 which is secured to bracket 92 on the inside of frame portion 24. Cable 84 passes around pulley 93 (FIG. 17), passes around pulley 94 on wall 13 and then down around pin 95 (FIG. 24) on frame portion 24 with its end attaching to I-bolt 97 (FIG. 24) secured to bracket 99 on the inside of frame portion 24. Cable 85 passes around pulley 100 (FIG. 17) and thereafter passes around pulley 101 (FIG. 5) fastened to side wall 13'. Cable 87 passes around pulley 102 (FIG. 17) and then around pulley 103 (FIG. 5) fastened to side wall 13' proximate roof 12. The ends of cables 85 and 87 are fastened to frame portion 24 in mirror-image relationship to the structure shown in FIGS. 24 and 25.

Guides 104 (FIGS. 7, 8, 11 and 24) are provided on bottom frame portions 24 to guide them in a precise vertical direction during raising and lowering of the tanks. In this respect, each guide 104 (FIGS. 7 and 11) is a cylindrical member which is mounted on plate 105 by a pair of U-bolts 107. Plate 105 has one end welded to bottom rim member 41 and the opposite end welded to the side of frame portion 24. As can be seen from FIG. 8, a guide member 104 is located on each opposite side of frame portion 24. The outer ends of guide members 104 ride in channels 109 in side walls 13 and 13'. In this respect, it is to be noted that channels 109 are only shown in wall 13, but it will be appreciated that there are mirror image channels in wall 13'. The guides 104 are known in the prior art. Each guide member 104 in wall 13 has a microswitch 106 associated therewith which is located in channel 109 for terminating the upward drive of winch 72 when actuated by guide 104 to prevent lower frames 24 from continuing movement beyond a predetermined height, thereby obviating the possibility that the winch will be caused to operate when the bottom frame cannot be raised any higher.

A safety strap construction 110 (FIGS. 8 and 12) is provided and is connected between a freight container wall and each side of bottom frame member 24, as known in the prior art, for the purpose of locking the bottom frame member against further movement in the event that its downward speed should exceed a predetermined value, as might occur if one of the cables attached to the bottom frame would break. More specifically, each safety strap 110 includes a body 111 which is secured to frame member 24 by bolts 112. A strap 113 is coiled within body 111 and the upper end of strap 113 is secured to bracket 114 located on wall 13 proximate roof 112. The safety strap structure 110 has conventional internal mechanism for locking strap 113 within its housing and thus achieving the above-mentioned purpose of stopping downward movement of the bottom frame 24 if the latter should exceed a predetermined speed. As can be seen from FIG. 7, a safety strap structure 110 is located on each side of the bottom frame portion 24.

As explained above, when the tanks 21 are in their expanded positions, the frame bottom portions 24 rest on the floor 11 of the freight container. However, structure is provided in association with the top frame portion 23 for both guiding it in a vertical direction as it moves between collapsed and expanded positions and for holding it at an elevation above the middle of the wall 13 (FIG. 3) when the tanks 21 are in their fully expanded condition. In this respect, brackets 117 (FIGS. 3C, 6, 26 and 27) are secured to upper frame portions 23. More specifically, each bracket 117 includes a channel portion 119 having legs 120 with slots 121 therein. Bolts 122 extend through slots 121 in legs 120 and also extend through suitable apertures in frame portion 23. When bolts 122 are tightened, bracket 117 is firmly secured to upper frame portion 23. Bracket 117 includes a lower plate 123 having a hooked end 124. The foregoing is known in the prior art. In addition, an upright post 125 is welded to the top of plate 123 and a gusset 127 is welded to both plate 123 and post 125. Another gusset 129 is welded between the top leg 120 and post 125.

Channels 130 (FIGS. 2, 3, 15 and 18 are provided in side walls 13 and 13', and a bar 131 is welded in position in each of the channels. Bar 131 functions as a stop for hook plate 123. In this respect, the hook plate 123 of each member 117 rides in each channel 130 and when the plate 123 abuts bar 131 (FIG. 3C), the downward motion of upper frame portion 23 stops to thereby maintain the tanks 21 in the expanded positions of FIG. 3. The foregoing is known in the prior art. In addition, plates 132 are suitably fastened to the walls 13 and 13' proximate roof 12 (FIGS. 1, 2 and 3) and plates 132 are abutted by the ends 133 of bars 125 when the upper frame portions 24 are in their uppermost positions.

Structure is provided for locking the tanks 21 in their stowed position of FIG. 2. This structure is basically shown in prior art U.S. Pat. No. 4,735,457, which is incorporated herein by reference, but a description will be made of the present structure for the sake of completeness. When the tanks 21 have been pulled by the winch and cable arrangement to their stowed position of FIG. 2, the locking arrangement of FIGS. 18, 20, 21, 22 and 23 is utilized to lock them in position. More specifically, the locking structure includes a locking bar 135 which is moved to its extended position of FIGS. 18 and 20 perpendicular to wall 13 to bear against the underside of bottom frame portion 24 to maintain tanks 21 in their stowed position. Four locking bars 135 are associated with each lower frame portion 24. The locking bar 135 is fastened to a sleeve 137 which is pivotally mounted on shaft 139, and sleeve 137 is held against axial movement on shaft 139 by annular members 140 (FIG. 21) which are welded to shaft 139. An inclined strut 141 (FIG. 21) is welded between the underside of bar 135 and sleeve 137. In order to move bar 135 to the position of FIG. 20 for stowing the frame, lever 142, which is pivotally mounted at 143, is moved from its dotted line position to its solid line position. In order to do this, latch 144 is pivoted to its dotted line position to permit lever 142 to be moved from its dotted line position to its solid line position. The lower end 145 of rod 139 is pivotally mounted in lever 142 so that when the latter is moved toward its solid line position, rod 139 is raised. When it is raised, bar 135 moves from its dotted line position of FIG. 18 to its solid line position because the top of bar 135 rides along inclined cam surface 147 (FIG. 20A) which causes it to pivot outwardly to the solid line position shown in FIGS. 18 and 20. After lever 142 has been moved to its solid line position so that bar 135 is in its position of FIGS. 18 and 20, latch 144 is closed to retain lever 142 and bar 135 in their solid line positions. When it is desired to move bar 135 away from its extended position of FIG. 20 to release lower frame 24, latch 144 is moved to its dotted line position of FIG. 18, and lever 142 is pivoted downwardly to pull rod 139 downwardly. As the bar 135 is moved downwardly with rod 139, the strut 141 will engage inclined cam surface 149 to thereby pivot bar 135 to its dotted line position of FIG. 18 wherein bar 135 is received in recess 146. Rod 139 and lever 142 are housed in channel 150, and rod 139 is guided for vertical movement by angle bracket 148.

Figure 14:
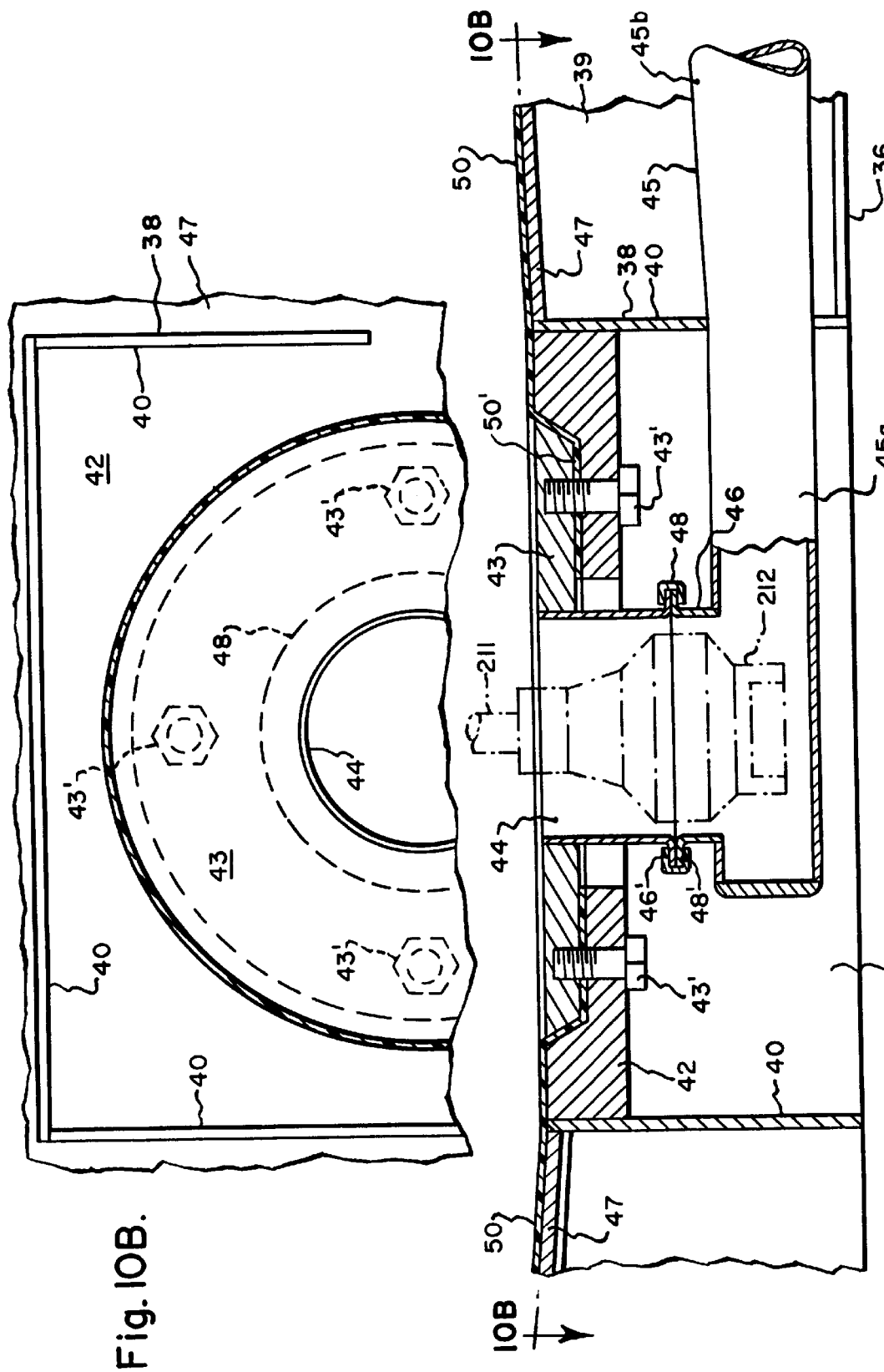
FIG. 14 is an enlarged fragmentary cross sectional view taken substantially along line 14—14 of FIG. 8 and showing the interfitting connection between the bottom frame portion and the floor of the freight container which prevents movement therebetween in a direction longitudinally of the freight container.

In FIG. 14 an arrangement is shown for locking the tank frames against movement longitudinally of the freight container when they are in their expanded positions of FIG. 3. In this respect, a toothed bar 152 (FIGS. 8 and 14) is bolted to frame member 41 by a pair of bolts 153. A companion toothed bar 154 is countersunk into the floor 11 of the freight container and is bolted thereto by bolts 155. When the tanks are in their expanded condition with the lower frame portion 24 resting on the floor 11 of the freight container, the toothed member 152 will mesh with toothed member 154 thereby preventing longitudinal movement of the lower frames 24 relative to the floor 11 of the freight container. This structure is known in the prior art.

In accordance with another aspect of the present invention, a tank washer assembly 200 (FIG. 31) is permanently mounted on each pair of tanks 21 mounted on each frame 22. The various parts of the washer assembly are shown in FIGS. 3B, 9, 10A, 28, 29 and 31. More specifically, as can be seen from FIG. 31, one of the hatch covers 183 has a pipe 201 welded thereto and the other hatch cover 183 has a pipe 202 welded thereto. This is the only difference between the two hatch covers. A pipe 203 is connected between pipes 201 and 202 by flange clamps 204. Additionally, a pipe 205 is provided which is connected to pipe 202 by another flange clamp 204. Thus, if it becomes necessary to remove the cover 183 which has pipe 201 welded thereto, it is merely necessary to remove flange clamp 204 at the end of pipe 201 to thereby disconnect pipe 201 from pipe 203. Also if it is necessary to remove hatch cover 183 having pipe 202 welded thereto, it is merely necessary to remove flange clamps 204 on the opposite ends of pipe 202 to thereby disconnect pipe 202 from pipes 203 and 205. Pipe 205 is connected to pipe 207 by means of a swivel joint 209.

Figure 31:
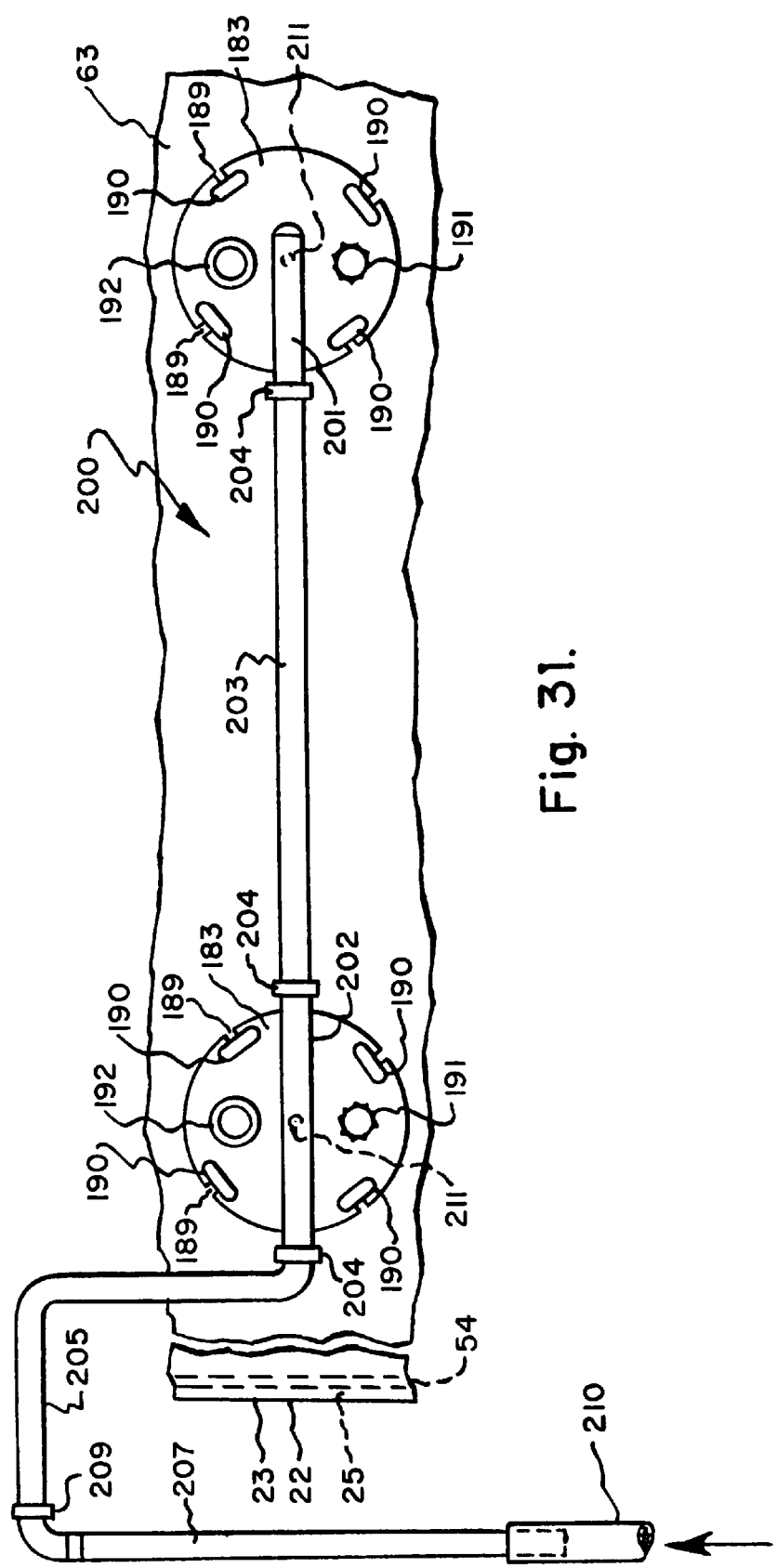
FIG. 31 is a plan view of the piping of the spray washer assembly mounted on the two tank hatches of the two tanks mounted on each tank-carrying frame.
Figure 35:
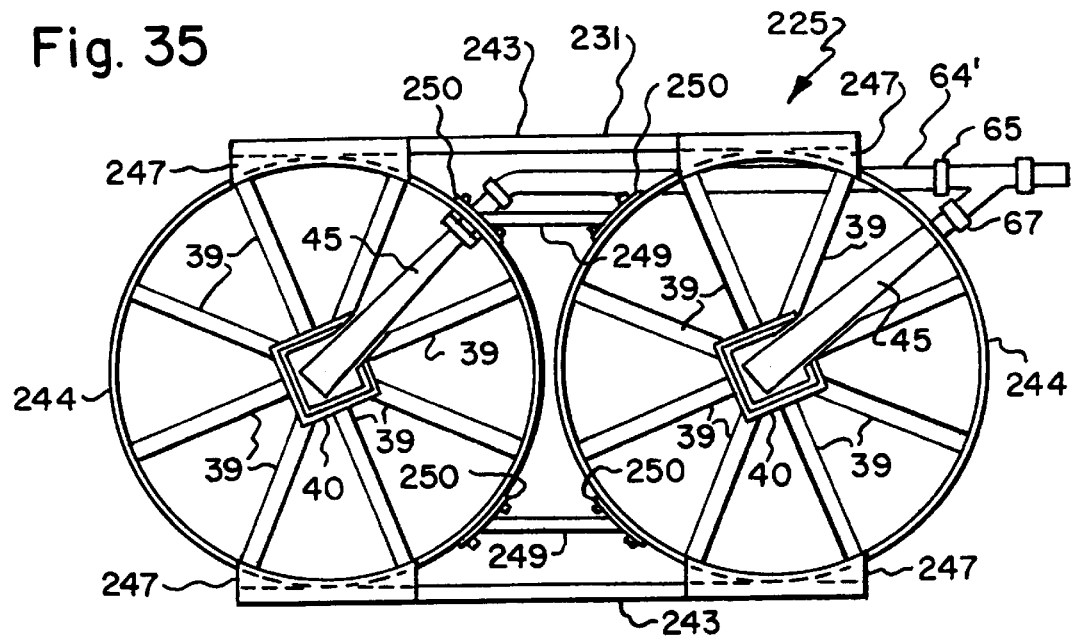
FIG. 35 is a view, with parts omitted, taken substantially in the direction of arrows 35—35 of FIG. 32 and showing another view of a portion of the bottom frame portion of the tank.

The conduit or pipe structure shown in FIG. 31 is used to supply liquid for washing tanks 21. In this respect, when it is desired to wash tanks 21, a hose 210 is installed on the end of pipe 207 when tanks 21 are in their expanded positions, such as shown in FIG. 3. The cleaning liquid is thus conducted through the piping of FIG. 31 to a conduit 211 in each tank 21. More specifically, one conduit 211 (FIG. 31) is in communication with pipe 202 and the other conduit 211 is in communication with pipe 201. The conduits 211 have a rotatable spray ball 212 mounted at the lower ends thereof for spraying the insides of tanks 21, and the washing liquid is discharged from tanks 21 through the piping shown in FIG. 3A at the bottoms of the tanks. The spray ball 212 sprays the liquid in a spherical pattern to thereby contact all portions of the inner surfaces of inner liner 34. The spray ball which is used may be of the type known as number 27500 which is manufactured by the Spraying Systems Company of Wheaton, Ill.

In accordance with the present invention, the above-described tank-washing assembly 200 is permanently mounted on tanks 21 both when the tanks are in an expanded condition and in a collapsed condition, thereby obviating the necessity to install the piping when it is necessary to wash the tanks. The only time that disassembly is required is when it is desired to remove the hatch covers 183, which is accomplished by unfastening the appropriate flange clamp or clamps 204 associated with the hatch covers. The position which conduit 211 and spray ball 212 occupy when the tank 21 is in an expanded position is shown in solid lines in FIG. 9, and the position that the spray ball occupies when the tank 21 is in a collapsed condition is shown in dotted lines in FIGS. 9 and 10A.

It is to be emphasized that while the foregoing description has been directed to a trailer type of freight container, most of the structural features described above are equally applicable to other types of freight containers, including but not limited to intermodal containers, straight trucks, box cars and aircraft.

It will also be appreciated that while the outlet of the piping, which is wholly contained within the described freight container, terminates proximate an opening in the side wall of the container, the piping can be modified so that it terminates proximate an opening in the front or rear walls or an opening in the floor of the freight container.

In FIGS. 32–43 a collapsible tank unit 225 is shown which comprises a pair of collapsible tanks 227 mounted on frame 229 consisting of a top frame portion 230 and a bottom frame portion 231. The tanks 227 which are mounted on frame 229 are movable between a stowed collapsed condition proximate the roof 12 of the frame container (FIG. 2) to an expanded condition where they are supported on the floor 11 and sides 13 and 13' of the freight containers (FIGS. 3 and 3C) as generally described above relative to tanks 21.

Figure 35A:
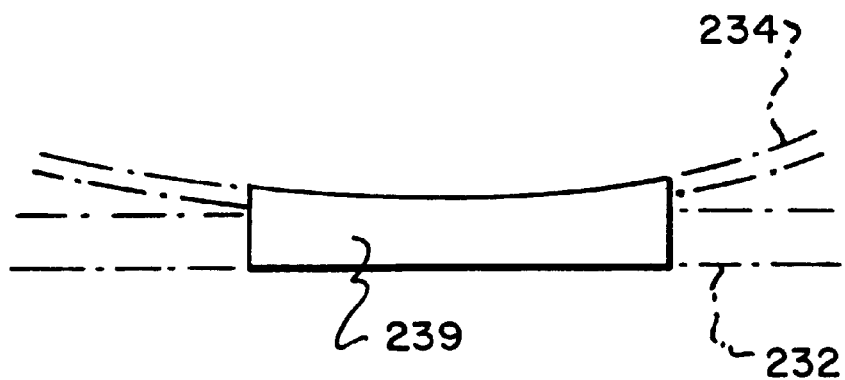
FIG. 35A is a plan view of a reinforcing plate.
Figure 43:
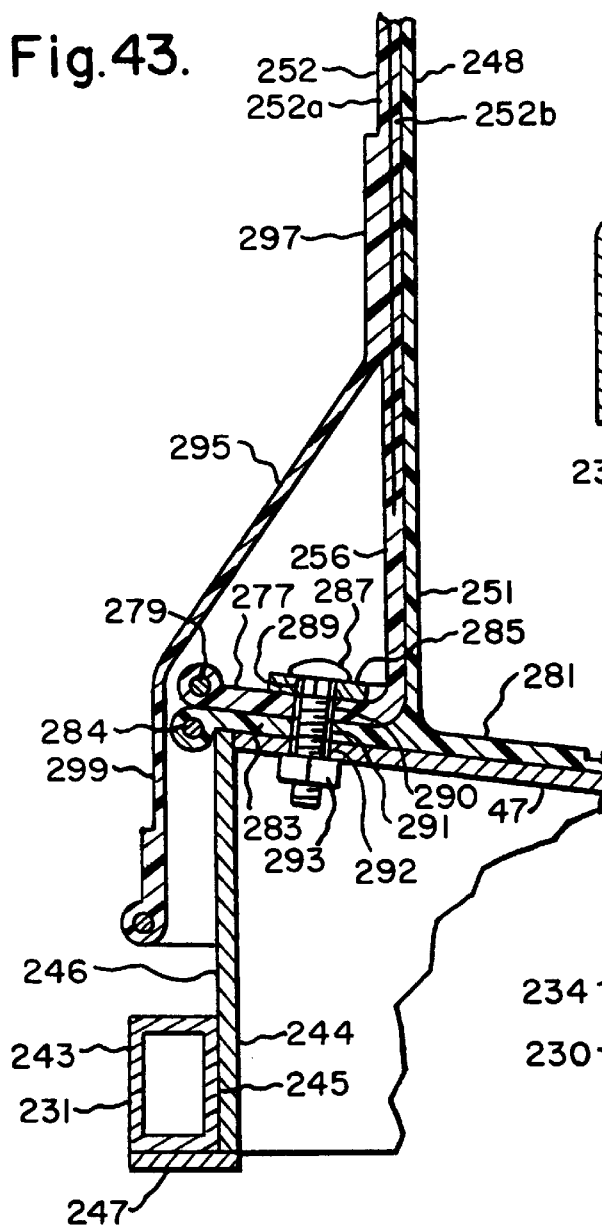
FIG. 43 is an enlarged cross sectional view showing the parts of FIG. 41 in assembled condition.

The top frame portion 230 comprises tubular sides 232 and 233 (FIGS. 33 and 37) which are hollow rectangular aluminum tubular members of the same cross sectional dimension. A frame member 235' of the same cross section as members 232 and 233 is welded to frame members 232. A pair of circular frame members or rims 234 (FIGS. 33 and 37) are welded to frame members 232 and 233 and to tubular frame member 235' at their areas of contact 237' (FIG. 36), and reinforcing plates 239 (FIGS. 35A, 36 and 37) are welded across the undersides of tubular members 233 and 234 and the undersides of tubular members 232 and 234 (FIG. 36) at 90° intervals, and to the undersides of tubular members 234 and 235' (FIG. 33). The top frame portion 230 also includes hollow tubular aluminum struts 240 welded between members 232 and 234 and also includes hollow tubular struts 241 welded between tubular members 233 and 234 and hollow tubular struts 242 welded between hollow tubular members 234 and 235'. Also, gussets 238' are welded between frame members 232 and 233.

The bottom frame portion 231 comprises two elongated hollow tubular aluminum members 243 (FIGS. 34, 35 and 43) of the same cross section as members 232 and 233. Members 243 have their opposite ends welded to circular sides or rims 244 of base 246 (FIGS. 35 and 43) at four areas 245. Reinforcing plates 247 (FIGS. 34 and 43), which are identical to plates 239 (FIGS. 35, 35A and 41), are also welded between frame members 244 and 243. Hollow tubular struts 249 are welded to arcuate plates 250 which are in turn bolted (FIG. 35) to sides 244 of base 246. The specific structure of the bottom frame portion 231 is shown in part in FIG. 35 wherein certain numerals are identical to those of FIG. 8 and they designate identical elements of structure. In the foregoing respect, the base 246 is identical to base 37 described above relative to FIGS. 8, 9 and 10, except for the manner in which the flexible tank sides 248 are attached thereto.

While not shown in FIGS. 32–43, except for the above-described structures of upper frame portion 230 and lower frame portion 231, and except for the improved manner in which the flexible collapsible sides 248 of tanks 227 are attached to upper frame portion 230 and lower frame portion 231, and except for the construction of flexible tank sides 248, all other parts of the collapsible tank structure are identical to the structure shown above in FIGS. 8, 9, 9C, 10, 10A, 10B, 28, 29 and 30. In addition, there has been a slight change in the subject matter of FIG. 31 in that conduit 205 has been detached from conduit 203 and conduit 203 has been closed at the point of detachment at 204. Additionally, a T has been inserted centrally in conduit 203 and conduit 210 has been attached to the T to supply liquid to conduit 203 through the T.

The side 248 of each collapsible tank 227 includes an inner flexible liquid impervious liner 251, which is fabricated of suitable sheet plastic, and shell 252, which is also preferably fabricated of suitable sheet plastic. The liner and shell each have a vertical lapped joint (not shown), but the vertical edges of the sheets can be joined in any suitable manner. In the specific embodiment shown, the liner 251 is a urethane composition which has walls which are 40 mils thick and is a polyester urethane film product of Bixby International Corp. and is designated Estane 58246. The shell 252 is a double ply of a PVC composition wherein each ply is 50 mils thick. It is a product of Seaman Corp. which is known as Model No. 9032 FRLTC-DC6. The shell is reinforced with polyester weft scrim which has great resistance to bulging due to the liquid pressure of the tanks 227, especially at the lower portions thereof.

Figure 37:
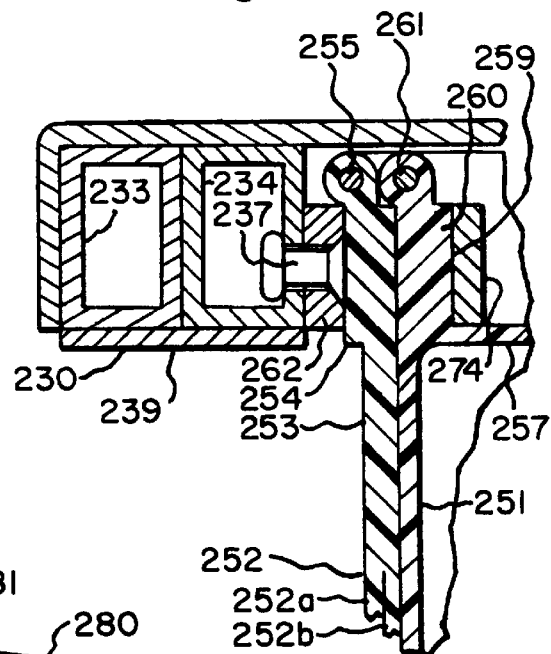
FIG. 37 is an enlarged fragmentary cross sectional view taken substantially along line 37—37 of FIG. 36 and showing a blind rivet connection used to secure the shell mounting band to its associated portion of the frame.
Figure 38:
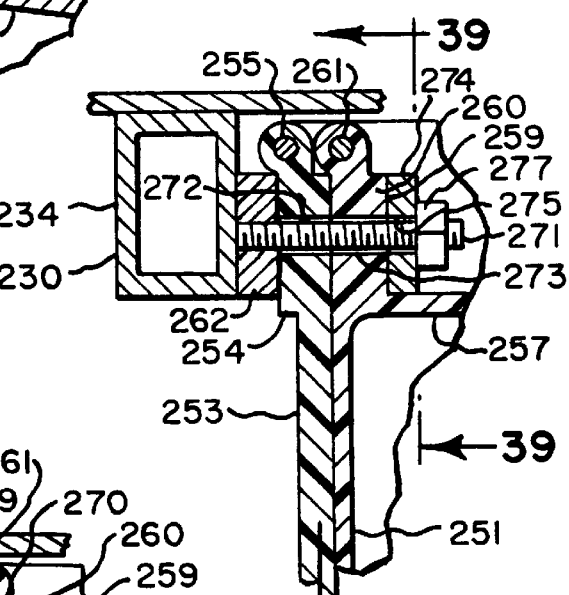
FIG. 38 is an enlarged fragmentary cross sectional view taken substantially along line 38—38 of FIG. 36 showing a stud connection utilized to secure the shell retaining band and the upper portion of the flexible shell to the upper frame portion of the tank.
Figure 40:
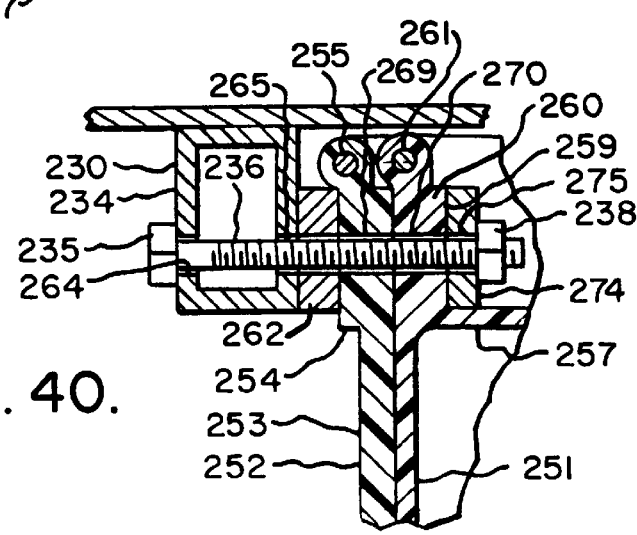
FIG. 40 is an enlarged fragmentary cross sectional view taken substantially along line 40—40 of FIG. 36 and showing a bolt connection which is utilized to secure the shell mounting band and the shell retaining band and the upper portion of the flexible shell to the rim of the upper frame portion.

As can be seen from FIGS. 37 and 38, the two plies 252a and 252b of shell 252 are fused to each other at their upper annular area 253 and their lower annular area 256, and ply 252a is bent over on itself at 254 and fused to itself after a roped edge has been made at 255. The roped edge is formed by enclosing a rope in the upper edge of the shell and sealing it therein by bending the edge of the shell back on itself as shown at 254. A circular plastic sheet 257, which is analogous to plastic sheet 53 of FIGS. 9, 9A and 9B, has an upstanding cylindrical edge portion 259 which is plastic welded or heat-sealed to the top edge portion 260 of liner 251, and the upper edge 261 of liner 251 is formed into a roped edge or bead. Thus, liner 251 and shell 252 both have roped edges 261 and 255, respectively, which serve their conventional purpose of preventing the liner 251 and shell 252 from moving downwardly out of their clamped position, which is described hereafter.

Figure 36:
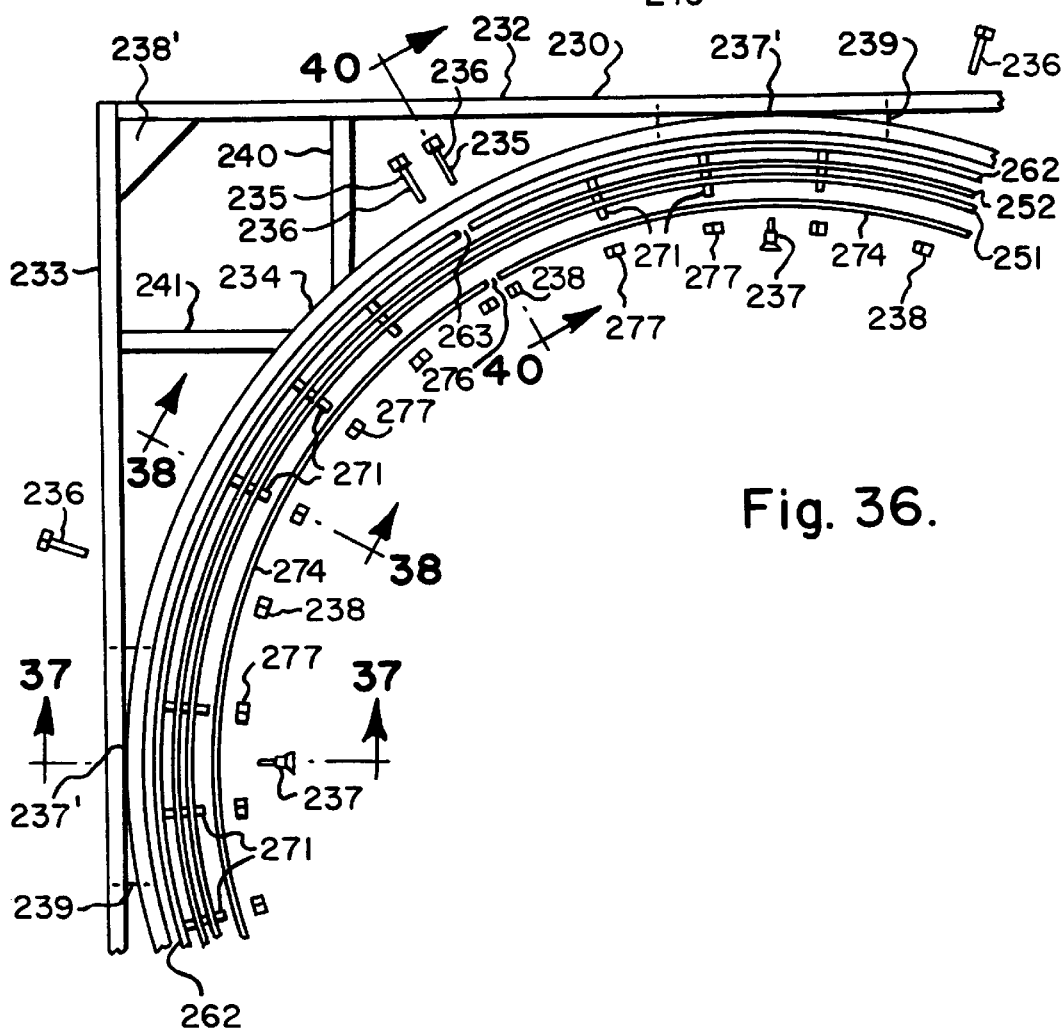
FIG. 36 is an enlarged fragmentary exploded view taken substantially along line 36—36 of FIG. 32 and showing various portions of the top frame portion of the tank.

The upper edge of flexible tank side 248 is clamped to upper tubular member or rim 234 in the following manner. Two tank side mounting bands 262 (FIG. 36A) are secured to circular tubular rim 234 by blind rivets 237 at spaced locations where plates 239 are located and by elongated fasteners, namely, nut and bolt assemblies 235 (FIGS. 36, 36A and 40), consisting of threaded bolts 236 and nuts 238. More specifically, as can be seen from FIGS. 36, 36A and 40, the nut and bolt assemblies 235 pass through the circular tubular member 234 and the shell mounting band 262 at spaced locations, and the blind rivets 237 (FIGS. 36 and 37) pass through the mounting band 262 at the spaced locations where plates 239 are located. There are two mounting bands 262 secured to rim 234, with each band having an extent of slightly less than 180°. There are two small gaps 263 (FIG. 36A) between the ends of the two bands 262. FIG. 36 shows a 90° portion of the mounting structure for the tank side 248, and it will be understood that the other 270° is identical, except for the areas where the two gaps 263 between the two bands 262 are located. The fact that the bolts 236 of the fastener assemblies 235 extend entirely through upper rim 234 provides a relatively strong joint in addition to facilitating the ease of assembly.

Figure 36A:
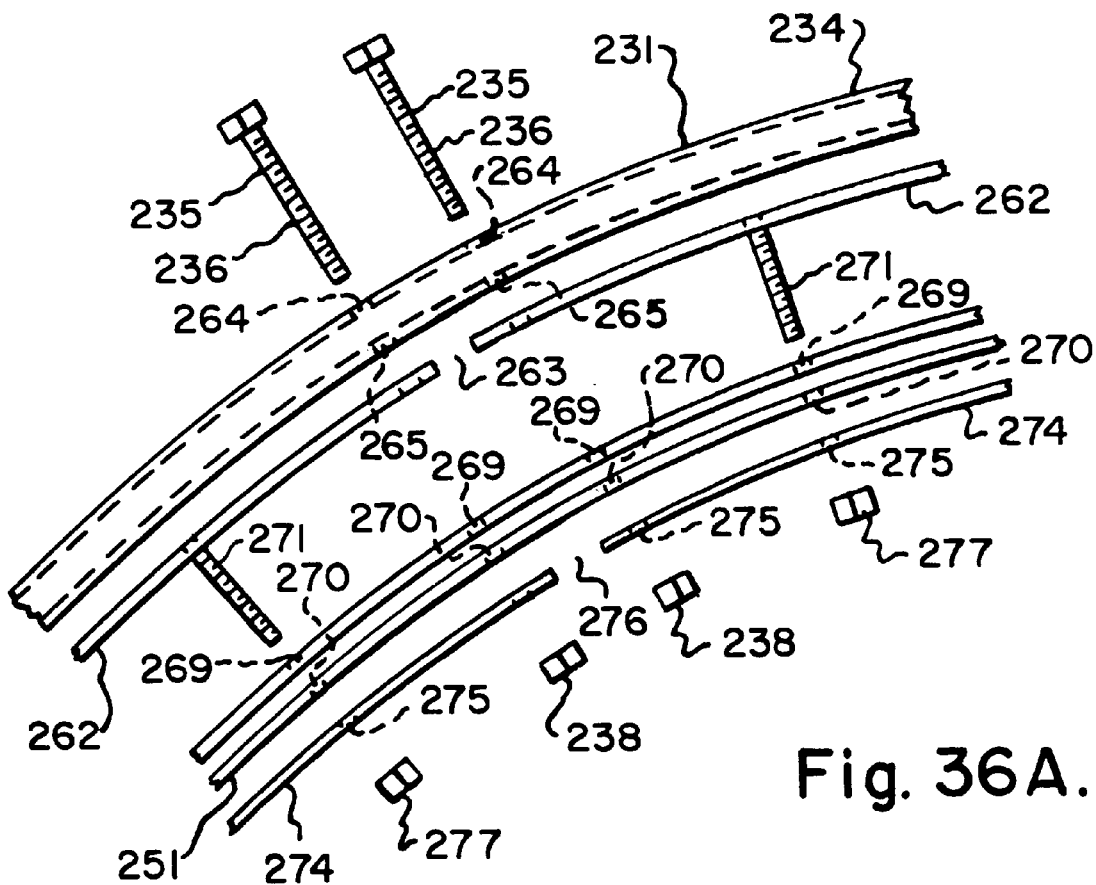
FIG. 36A is a fragmentary enlarged portion of FIG. 36.

After the two tank side mounting bands 262 have been secured to rim 234 by blind rivets 237, and after bolts 236 have been inserted through holes 264 and 265 of rim 234, the shell 252 and liner 251 can be secured to bands 262 and rim 234. In this respect, the shell 252 and liner 251 have spaced holes 269 and 270 (FIG. 40), respectively, therein, and the bolts 236 are inserted through these holes. In addition, tank mounting bands 262 have a plurality of elongated fasteners, namely, threaded studs 271 welded thereto and extending outwardly therefrom (FIGS. 36, 36A and 38). The shell 252 and liner 251 also have spaced holes 272 and 273 (FIG. 38), respectively, therein through which studs 271 are inserted. After the shell 252 and liner 251 have been mounted on bolts 236 and studs 271, two retaining bands 274 (FIGS. 36A, 38, 39 and 40) are positioned adjacent the top portion 259 of liner 251 with the bolts 236 and studs 271 extending through holes 275 of the retaining band 274 (FIGS. 38, 39 and 40), and thereafter nuts 238 and 277 are tightened onto bolts 236 and studs 271, respectively, to tightly clamp the upper edges 254 and 259 of shell 252 and liner 251, respectively, between the two mounting bands 262 and the two retaining bands 274. Each retaining band is slightly less than 180° in extent, and there are two gaps 276 between the bands.

The lower edges of shell 252 and liner 251, which comprise the lower edge of the flexible tank side, are secured to base 246 of tank 227 in the following manner. The lower portion of shell ply 252b is folded over on itself at 277 (FIGS. 41 and 43) and sealed around plastic rope 279 to produce a roped edge. Also the circular tank liner bottom 280, which is analogous to circular tank liner bottom 50 of FIG. 9 and which is an impervious liner material such as the material of liner 251, is sealed at 281 (FIG. 43) to the portion of liner side 251 which is folded at 282 (FIG. 41). The circular bottom 280 is extended beyond liner side 251 and folded over on itself and sealed at 283 to form a roped edge in combination with plastic rope 284. The roped edges 277 and 283 comprise the lower edge of tank side 248 and they extend transversely thereto. After the roped edges 277 and 283 have been formed they are clamped between retaining band 285 (FIGS. 41, 42 and 43) and bottom plate 47 of base 246, bottom plate 47 being identical to dished bottom plate 47 of FIGS. 9 and 10A. The clamping is effected by elongated fasteners, namely, carriage bolts 287 which extend through holes 289 in retaining band 285 and holes 290 and 291 in roped edges 277 and 283, respectively, and through spaced holes 292 in dished plate 47. Nuts 293 are tightened onto bolts 287 to complete the clamping function.

An annular flexible plastic skirt 295 of the same material as shell 252 has an upper portion 297 which is heat-sealed to ply 252a of shell 252 and it has a lower roped edge 299. Skirt 295 covers the portions of the lower edge of the tank side 248 which is attached to base 246.

The tank unit 225 can be expanded and collapsed by the structure shown in FIGS. 15–27 or by any other suitable structure.

It can thus be seen that the improved collapsible tank is manifestly capable of achieving the above-enumerated objects, and while a preferred embodiment of the present invention have been disclosed, it will be appreciated that it is not limited thereto but may be otherwise embodied within the scope of the following claims.

We claim:

1. A collapsible tank comprising an upper rim, a base, a flexible side, an upper edge on said flexible side, a lower edge on said flexible side, a mounting band mounted on said upper rim, a plurality of elongated fasteners extending inwardly from said mounting band, a plurality of first holes in said upper edge of said flexible side through which said elongated fasteners extend, a retaining band extending substantially parallel to said mounting band, and a plurality of second holes in said retaining band through which said elongated fasteners extend, said elongated fasteners comprising first elongated fasteners which extend through said rim and said mounting band and said upper edge and said retaining band, and second elongated fasteners which are integrally fastened to and only extend outwardly from said mounting band and extend through said upper edge and said retaining band.

2. A collapsible tank as set forth in claim 1 wherein said first and second elongated fasteners comprise threaded members and nuts mounted thereon.

3. A collapsible tank as set forth in claim 1 wherein said flexible side comprises a liner having a first upper edge and a shell having a second upper edge, and wherein said first and second elongated fasteners extend through both said first and second upper edges.

4. A collapsible tank as set forth in claim 3 wherein said first and second elongated fasteners comprise threaded members and nuts mounted thereon.

5. A collapsible tank as set forth in claim 3 wherein said first and second upper edges are roped edges.

6. A collapsible tank as set forth in claim 5 wherein said shell is a double ply of plastic sheeting with said plies fused to each only other proximate said upper rim and said lower edge.

7. A collapsible tank as set forth in claim 1 including wherein said lower edge on said flexible side extends along said base, a second retaining band mounted on said lower edge, and a plurality of third elongated fasteners extending through said second retaining band and said lower edge and said base.

8. A collapsible tank as set forth in claim 7 wherein said lower edge of said flexible side comprises a liner having a first lower edge and a shell having a second lower edge, and wherein said third elongated fasteners extend through both said first and second lower edges.

9. A collapsible tank as set forth in claim 8 wherein said liner includes a first upper edge and said shell includes a second upper edge, and wherein said first and second elongated fasteners extend through both said first and second upper edges.

10. A collapsible tank as set forth in claim 7 wherein said base includes a bottom plate with an outer edge, and wherein said lower edge of said flexible side extends transversely to the adjacent portion of said flexible side and along said outer edge of said bottom plate and is secured to said outer edge of said bottom plate.

11. A collapsible tank as set forth in claim 10 wherein said lower edge of said flexible side comprises a liner having a first lower edge and a shell having a second lower edge, and wherein said third elongated fasteners extend through both said first and second lower edges.

12. A collapsible tank as set forth in claim 11 wherein said liner includes a first upper edge and said shell includes a second upper edge, and wherein said first and second elongated fasteners extend through both said first and second upper edges.

13. A collapsible tank as set forth in claim 6 wherein said lower edge on said flexible side extends along said base, a second retaining band mounted on said lower edge, and a plurality of third elongated fasteners extending through said second retaining band and said lower edge and said base.

14. A collapsible tank as set forth in claim 13 wherein said lower edge of said flexible side comprises a liner having a first lower edge and a shell having a second lower edge, and wherein said third elongated fasteners extend through both said first and second lower edges.

15. A collapsible tank as set forth in claim 14 wherein said base includes a bottom plate with an outer edge, and wherein said lower edge of said flexible side extends transversely to the adjacent portion of said flexible side and along said outer edge of said bottom plate and is secured to said outer edge of said bottom plate.

16. A collapsible tank comprising an upper rim, a base, an outer edge on said base, a flexible side including a shell and a first liner, an upper edge on said flexible side connected to said upper rim, a bottom edge on said shell, a second liner on said base extending along said base, an outer edge on said second liner, a lower edge on said shell extending transversely to the adjacent portion of said shell and along said outer edge of said second liner, a retaining band overlying said lower edge of said shell and said outer edge of said second liner and said outer edge of said base, and bolts extending through said lower edge of said shell and said second outer edge of said second liner and said outer edge of said base.

* * * * *

UNITED STATES PATENT AND TRADEMARK OFFICE
CERTIFICATE OF CORRECTION

PATENT NO. : 6,131,756
DATED : October 17, 2000
INVENTOR(S) : James J. Bonerb et al.

Page 1 of 1

It is certified that error appears in the above-identified patent and that said Letters Patent is hereby corrected as shown below:

<u>Column 14,</u>
Line 60 (claim 7), delete "including".
Add the following claim:

-- 17. A collapsible tank as set forth in claim 3 wherein said shell is a double ply of plastic sheeting with said plies fused to each other only proximate said upper rim and said lower edge. --

Signed and Sealed this

Twenty-third Day of October, 2001

Attest:

*Nicholas P. Godici*

NICHOLAS P. GODICI
*Attesting Officer*   *Acting Director of the United States Patent and Trademark Office*